(12) United States Patent
Sales

(10) Patent No.: US 11,666,495 B2
(45) Date of Patent: Jun. 6, 2023

(54) GURNEY TRANSFER ASSIST DEVICE

(71) Applicant: CRITICAL AIRLIFT SAFE LOADER LLC, Spokane, WA (US)

(72) Inventor: Mark S. Sales, Coeur D' Alene, ID (US)

(73) Assignee: Critical Airlift Safe Loader LLC, Spokane, WA (US)

( * ) Notice: Subject to any disclaimer, the term of this patent is extended or adjusted under 35 U.S.C. 154(b) by 550 days.

(21) Appl. No.: 16/858,601

(22) Filed: Apr. 25, 2020

(65) Prior Publication Data

US 2020/0337917 A1      Oct. 29, 2020

Related U.S. Application Data

(60) Provisional application No. 62/840,243, filed on Apr. 29, 2019.

(51) Int. Cl.
*A61G 3/02* (2006.01)
*A61G 1/04* (2006.01)
*B64C 27/04* (2006.01)

(52) U.S. Cl.
CPC ............. *A61G 3/0245* (2013.01); *A61G 1/04* (2013.01); *B64C 27/04* (2013.01)

(58) Field of Classification Search
CPC .... A61G 2220/10; A61G 1/06; A61G 3/0245; A61G 3/0825; A61G 3/0883; A61G 3/0891
See application file for complete search history.

(56) References Cited

U.S. PATENT DOCUMENTS

| 5,135,350 | A | 8/1992 | Eelman et al. |
| 5,490,703 | A | 2/1996 | Hewko |
| 5,738,306 | A | 4/1998 | Mass et al. |
| 5,779,296 | A * | 7/1998 | Hewko ............... A61G 3/0866 244/118.6 |
| 7,478,855 | B2 | 1/2009 | Lambarth et al. |
| 7,984,523 | B2 | 7/2011 | Campani |
| 8,336,939 | B2 | 12/2012 | Green et al. |
| 9,107,785 | B2 | 8/2015 | Ferrin |

(Continued)

FOREIGN PATENT DOCUMENTS

| AU | 2011200503 A1 | 8/2011 |
| DE | 102011078803 A1 | 1/2013 |

(Continued)

OTHER PUBLICATIONS

Utila Geratebau GMBH+Co. KG, Information Scissor Lift Transporter, 2015.

*Primary Examiner* — Robert G Santos
*Assistant Examiner* — Adam C Ortiz
(74) *Attorney, Agent, or Firm* — Randall Danskin P.S.

(57) ABSTRACT

A gurney transfer assist device for a helicopter has a fixed height frame supporting a slidably movable bed deck frame. The fixed height frame is releasably secured to a known wheeled gurney. The fixed height dimension raises a carried stretcher to a vertical height to allow transfer to and/or from a medical helicopter loading surface. The slidably movable bed deck frame is extendable outwardly from one end of the fixed height frame and the extending end is angulated to facilitate transfer of the stretcher and supported patient to/from the helicopter loading surface.

19 Claims, 11 Drawing Sheets

(56) References Cited

U.S. PATENT DOCUMENTS

2017/0202715 A1    7/2017   Carletti
2017/0296404 A1    10/2017  Burkeen

FOREIGN PATENT DOCUMENTS

| EP | 1920745 | A2 |   | 5/2008  |
|----|---------|----|---|---------|
| EP | 3738569 | A1 | * | 11/2020 |
| WO | 2018161107 | A1 | | 9/2018 |

* cited by examiner

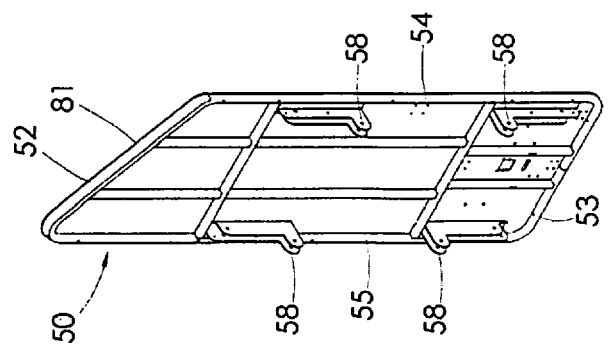
FIG.13
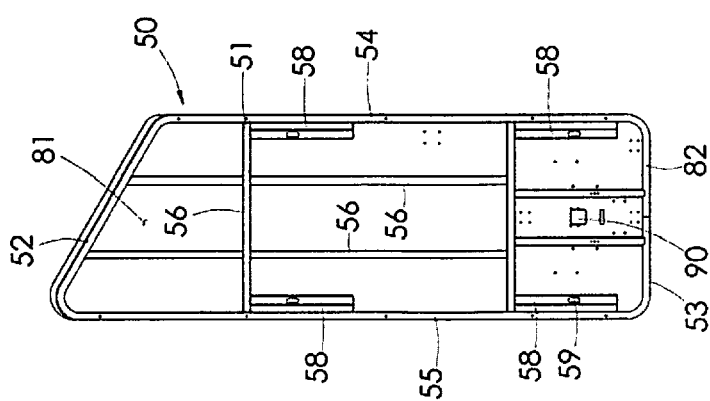
FIG.12
FIG.11
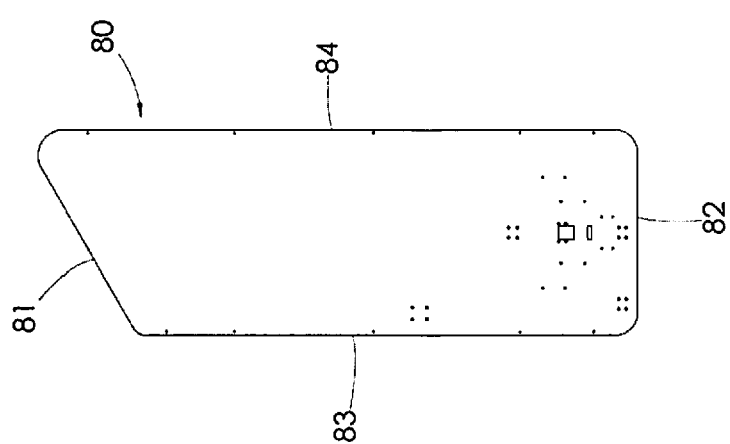
FIG.10

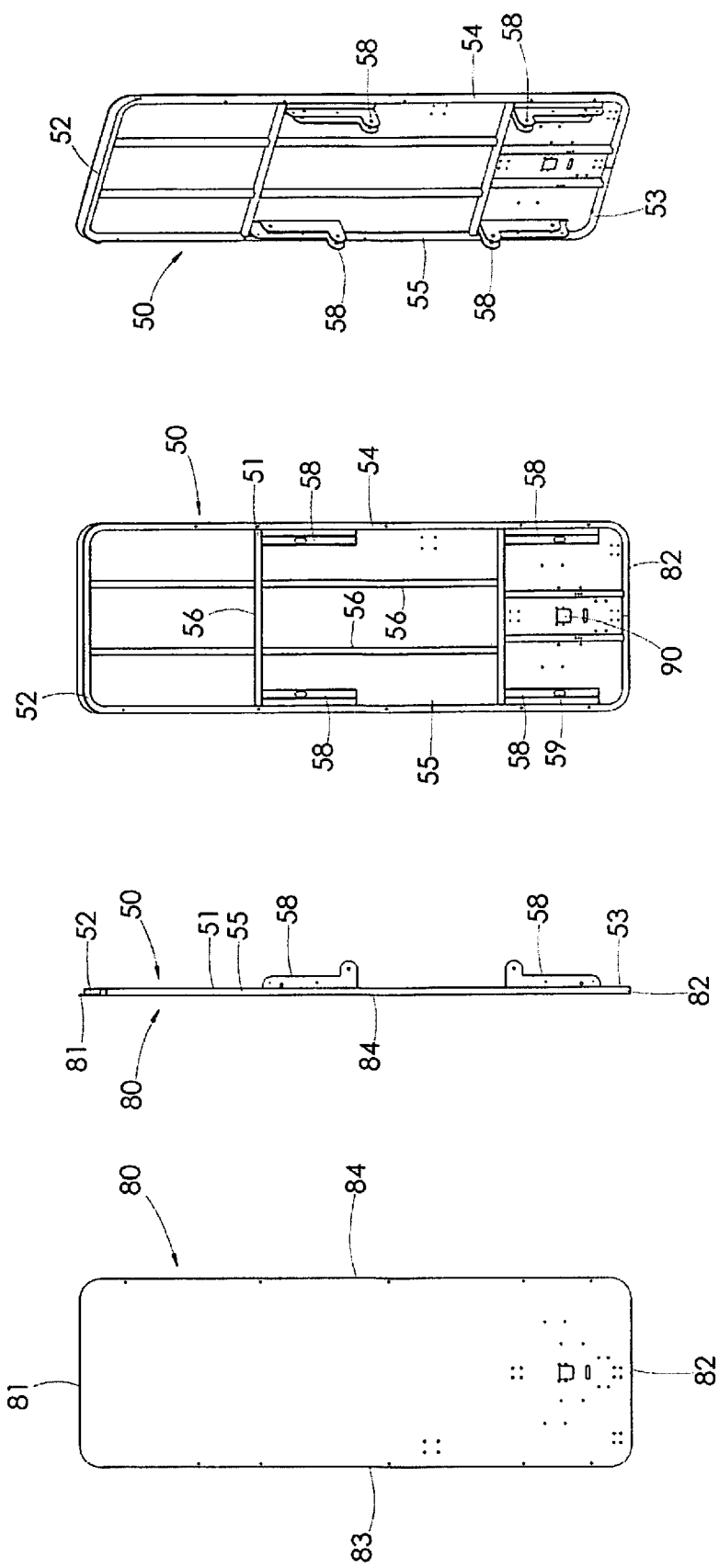

GURNEY TRANSFER ASSIST DEVICE

RELATED PATENT APPLICATIONS

This utility patent application claims priority to earlier filed U.S. Provisional Patent Application Ser. No. 62/840,243 filed on 29 Apr. 2019 and titled GURNEY TRANSFER ASSIST DEVICE. The inventor named in earlier filed U.S. Ser. No. 62/840,243, Mark S. Sales, is the same inventor named in this Utility patent application. The entire contents and disclosures of earlier filed U.S. Ser. No. 62/840,243 is fully incorporated herein.

TECHNICAL FIELD

This invention relates to transfer assist devices and more particularly, to a device for a patient gurney which facilitates transferring a patient on a stretcher onto and off of, a medical helicopter or other transport vehicle to prevent injuries to medical personnel transferring the patient.

BACKGROUND OF THE INVENTION

When a patient is transported from one location to another, or one vehicle to another, and more particularly when a patent is moved onto/or off of a helicopter, the patient is generally placed onto a stretcher. The stretcher is then loaded onto a helicopter to transport the patient to a health care facility. Once the helicopter arrives at the health care facility, a wheeled gurney from the health care facility is brought to the helicopter. The stretcher, carrying the patient, is then transferred from the helicopter to the gurney by medical personnel. Although the present invention is primarily directed toward medical helicopter transport, the invention is equally applicable to other means/modes of transportation, including, but not limited to ambulances, fire trucks, wheeled vehicles and other types of aircraft.

While the gurney may be adjustable in height, many gurneys, even when extended to a maximum adjustable height, do not extend up to a patient supporting surface within the helicopter (hereinafter "helicopter loading surface"). The height of the helicopter loading surface varies from aircraft to aircraft and the helicopter loading surface may be on the floor of the helicopter, or may be on top of a platform with drawers and/or storage underneath. Many times there is a material vertical height difference between the helicopter loading surface and the top surface of the gurney. This height differential requires that medical personnel physically, and simultaneously, lift and move the stretcher, and the patient, and attached medical equipment, from a first position, to a second position. The simultaneous lifting and moving subjects medical personnel, including the helicopter pilot, to workplace injuries and presents risks to the patient being transferred.

My invention provides a gurney transfer assist device. The invention has a fixed height frame supporting a slidably movable bed deck frame. The fixed height tubular box frame is releasably secured to a known wheeled gurney. The fixed height dimension raises a carried stretcher a vertical height sufficient to allow loading/unloading onto a helicopter. The slidably movable bed deck frame is extendable outwardly from one end of the fixed height frame and the extending end is angulated to facilitate transfer of the stretcher and supported patient to/from the helicopter and to provide adequate "space" for multiple persons to assist in the transfer.

The fixed height frame has a lower rectilinear frame member and a spaced apart upper rectilinear frame member. Each of the lower and upper frame members have two opposing parallel end portions and two opposing parallel lateral side portions. The opposing parallel lateral side portions are longer than the end portions. The lower and upper rectilinear frame members are structurally interconnected to one another by plural frame supports. Cross bracing extends between the opposed parallel lateral side portions of each frame member to maintain rigidity. The fixed height frame provides a fixed vertical height dimension which is approximately 12 inches between the upper and lower frame members. The upper frame member carries an adjustment rack that operatively cooperates with a corresponding adjustment member to control extension and retraction of a slidably movable bed deck frame carried by the fixed height frame.

The bed deck frame has two opposing and spaced apart end portions, and two opposing, and spaced apart, parallel lateral side portions. Cross braces extend between the lateral side portions to provide rigidity and strength. A handle end carries an upwardly arched handle and is generally perpendicular to the lateral side portions. An opposing foot end, is angulated and is not parallel to the handle end portion. The angled foot end eases transfer of a supported stretcher/patient onto/off of the helicopter by allowing the wheeled gurney to be positioned relative to the helicopter so that the stretcher may be "slidably moved" onto/off of the helicopter and onto/off of the bed deck frame. The angulation of the foot end reduces the need for medical personnel to physically lift and simultaneously move the stretcher from one position to another position and facilitates the "sliding" of the stretcher and patient, and may also align the patient and/or stretcher with a designated patient supporting surface within a medical transport vehicle. The parallel lateral side portions of the bed deck frame (on the bottom surface) carry slider brackets that support slide members so that the bed deck frame freely translates along the side members of the fixed height frame. A latch assembly is carried on the underside of the bed deck frame and releasably engages with the adjustment rack carried by the fixed height frame. An operator, using a handle attached to a lever can optionally engage/disengage the latch assembly from the adjustment rack. When disengaged, the bed deck frame is slidable along the fixed height frame from a first (retracted) position to a second position. In the first retracted position, the bed deck frame is generally centered upon the fixed height frame (and centered on the supporting gurney). In the second extended position, the bed deck frame extends a distance of approximately twenty-two inches endwardly from the fixed height frame in the direction of the foot end of the bed deck frame. This endwardly extension of the bed deck frame facilitates transfer of the stretcher/patient from the invention onto/off of the helicopter even when the wheeled gurney (not shown) is prevented from moving closely to the helicopter because of the helicopter skids/structure.

A generally planar load supporting deck is carried by the bed deck frame between the opposing end portions and between the parallel lateral side portions. The load supporting deck is comprised of a material that is not absorbent, easily cleanable and is "slippery" so that a stretcher may easily slide thereon and therealong. A puck receiver is defined in the load supporting deck generally medially between the opposing parallel lateral side portions and spacedly adjacent the handle end portion. The puck receiver is configured to releasably engage with an outwardly extending puck that is an integral component of many patient stretchers used in medical helicopters. A similar puck receiver is commonly carried within many medical helicopters so as to positionally secure a stretcher to the helicopter loading surface.

The load supporting deck is large enough to also support medical equipment that may be "attached" to the patient and necessary during the transport, such as, but not limited to respirators, IV fluid racks, and the like.

In use, the fixed height frame is supported upon a wheeled gurney on an upper surface thereof. The fixed height frame may be attached to the gurney with flexible straps that communicate between the fixed height frame and the gurney. In one contemplated embodiment, frame supports may define through slots configured to receive fastening straps. The fixed height frame provides an additional approximately 12-inch height to the standard wheeled gurney.

When moving the patient, upon the stretcher, onto/off of a medical helicopter, the wheeled gurney is positioned as close as possible to an open helicopter door. Typically helicopter skids, which extend laterally outwardly from the helicopter, prevent the wheeled gurney from being positioned immediately adjacent to the helicopter door/deck. Once the wheeled gurney is positioned as close as possible to the helicopter, which may be immediately adjacent the helicopter skid, the medical personnel may secure the wheel brakes on the gurney and then may disengage the latch mechanism to slide the bed deck frame and load supporting deck, (carrying the stretcher and patient) toward the second extended position whereupon the foot end of the bed deck frame physically contacts the helicopter loading surface. The gurney may be oriented angularly relative to the helicopter such that a corner portion of the stretcher carrying the patient is positioned directly upon the helicopter loading surface. (This orientation is facilitated by the angular configuration of the bed deck). The stretcher carrying the patient may thereupon be slidably moved along the load supporting deck and on to the helicopter/off of the helicopter without any lifting of the stretcher and/or patient.

The angulation of the foot end also allows more than only two medical personnel to position themselves immediately adjacent the helicopter door and the stretcher during patient transfer which assists in sharing the weight/load and provides more "hands" to assist in the transfer which enhances safety.

SUMMARY OF THE INVENTION

A first aspect of the present invention relates to a gurney transfer assist device for transferring a stretcher carrying a patent from a wheeled gurney, to a second location, and from a first location, to a wheeled gurney, the transfer assist device comprising: a fixed height frame having a first end portion, a second end portion, a first lateral side, a second lateral side and a predetermined fixed height dimension between an upper edge portion and a lower edge portion: an adjustment rack, adjacent the upper edge portion of the fixed height frame, that provides controllable movement, and positional securement, of a slidably movable bed deck frame relative to the fixed height frame between a first position wherein the slidably movable bed deck frame is positioned adjacent above, and substantially centered over, the fixed height frame, and a second extended position wherein the slidably movable bed deck frame is translated along the fixed height frame to extend endwardly outwardly from a first end portion of the fixed height frame; the slidably movable bed deck frame is quadrilateral in peripheral configuration and has a handle end, a foot end, a first shorter lateral side and a second longer lateral side and the first and second lateral sides are parallel to one another, and are both longer in length dimension than the handle end and the foot end, and the foot end is not parallel to the handle end; plural slide brackets are structurally carried on an underside of the slidably movable bed deck frame, and each of the plural slide brackets support at least one slide member that frictionally translates along the upper edge portion of the fixed height frame so that the slidably movable bed deck frame translates along the fixed height frame; a latch assembly, having an operator handle, on an underside of the slidably movable bed deck frame to controllably engage with the adjustment rack carried by the fixed height frame; a generally planar load supporting deck carried by the slidably movable bed deck frame between the handle end and the foot end and between the parallel lateral side portions; and a puck receiver is defined in the generally planar load supporting deck between the lateral side portions and spacedly adjacent the handle end portion to releasably engage with an outwardly extending puck carried by a stretcher.

A further aspect of the present invention relates to a transfer assist device and further comprises an elongate side rail carried by the slidably movable bed deck frame on plural spacedly arrayed side rail mounting posts adjacent each opposing lateral side portion of the slidably movable bed deck frame and extending parallel to, and spacedly above the load supporting deck, each elongate side rail having a first end portion, a spaced apart second end portion, and a side rail rotation frame between the first end portion and the second end portion, the rotation frame structurally carrying a generally planar, and pivotally movable slide rail panel that has a top surface, an opposing bottom surface, a hinge edge and a distal edge, and the slide rail panel is movable between a first locking position wherein the slide rail panel is oriented generally vertically, and generally perpendicular relative to the load supporting deck providing a physical barrier to retain a patient on the load supporting deck, and a second position wherein the slide rail panel is oriented generally coplanar with, and spaced laterally adjacent to, the load supporting deck to facilitate movement of the stretcher and a patient thereon onto and off of the load supporting deck.

A further aspect of the present invention relates to a transfer assist device and further comprises an operator controllable locking mechanism carried by the generally planar slide rail panel that positionally secures the slide rail panel in a desired position relative to the load supporting deck.

A further aspect of the present invention relates to a transfer assist device and further comprises a generally planar and elongate roller shield carried by, and depending downwardly from, an underside of the slidably movable bed deck frame adjacent laterally outwardly of the plural slider brackets, each roller shield having a height dimension that is greater than a diameter of the at least one slide member, and having a length dimension that is greater than a distance between the plural slider brackets carried on one lateral side portion of the slidably movable bed deck frame, to simultaneously shield the slide members of the spaced apart slider brackets from entanglement.

A further aspect of the present invention relates to a transfer assist device and wherein the second location is an aircraft patient supporting surface.

A further aspect of the present invention relates to a transfer assist device and wherein the first location is an aircraft patient supporting surface.

A further aspect of the present invention relates to a transfer assist device and wherein the fixed height frame has a lower frame member and an upper frame member.

A further aspect of the present invention relates to a transfer assist device and wherein the lower frame member is generally rectilinear in peripheral configuration and has two opposing parallel and spaced apart end portions formed of beams, and two opposing and spaced apart parallel lateral side portions formed of beams, and the two opposing parallel and spaced apart lateral side portions are longer in a length dimension than the parallel and spaced apart end portions, and the end portion beams and the lateral side portion beams are structurally interconnected to one another at adjacent end portions, and plural cross braces formed of beams extend between the parallel spaced apart lateral side portions; and the upper frame member is generally rectilinear in peripheral configuration and has two opposing parallel and spaced apart end portions formed of beams, and two opposing parallel and spaced apart lateral side portions formed of beams, and the two opposing parallel and spaced apart lateral side portions are longer in a length dimension than the parallel and spaced apart end portions, and the end portion beams and the lateral side portion beams are structurally interconnected to one another at adjacent end portions, and plural cross braces formed of beams extend between the parallel lateral side portions; and the upper frame member is longer in length dimension than the lower frame member and is structurally interconnected to, and is spaced apart from the lower frame member, by a predetermined fixed height distance, by plural spacedly arrayed frame supports that extend between an upper surface of the lower frame member, and a lower surface of the upper frame member.

A further aspect of the present invention relates to a transfer assist device and wherein the fixed height frame is formed, at least partially, of box beams, and/or at least partially tubular beams, and/or at least partially sheet metal.

A further aspect of the present invention relates to a transfer assist device and wherein the slide member is a roller wheel carried on an axle.

A further aspect of the present invention relates to a transfer assist device and wherein the adjustment rack is elongate and has a plurality of spaced apart and upwardly oriented teeth and is carried by the fixed height frame, adjacent an upper edge of the fixed height frame, and the plurality of spaced apart and upwardly oriented teeth releasably and controllable engage with the latch assembly to facilitate controllable movement, and positional securement, of the slidably movable bed deck frame relative to the fixed height frame between a first position wherein the slidably movable bed deck frame is positioned above, and substantially centered over, the fixed height frame, and a second extended position wherein the slidably movable bed deck frame is translated along the fixed height frame to extend endwardly outwardly from the first end portion of the fixed height frame.

A further aspect of the present invention relates to a transfer assist device and wherein the slidably movable bed deck frame has two opposing and spaced apart end portions, formed of beams, and two opposing and spaced apart parallel lateral side portions, formed of beams, and each of the two opposing and spaced apart lateral side portions have different length dimensions, and the slidably movable bed deck frame is slidably carried by the fixed height frame; a handle end portion, formed of a beam, extends generally perpendicularly between the two spaced apart and parallel lateral side portions at proximate ends thereof and is structurally interconnected thereto at adjacent end portions, and the handle end portion carries an upwardly extending handle; a foot end portion formed of a beam, extends between and is structurally interconnected to proximate end portions of the two spaced apart and parallel lateral side portions opposite the handle end portion, and the foot end portion is not parallel to the handle end portion; and strengthening braces are spacedly arrayed between, and structurally interconnect the spaced apart parallel lateral side portions.

A further aspect of the present invention relates to a transfer assist device and wherein the puck receiver has a first angled engagement guide, a second angled engagement guide, a puck anchor head and a puck lock, and the first and second angled engagement guides define a receiver opening opposite the anchor head to guide the puck carried on the underside of the stretcher into engagement with the puck lock proximate the puck anchor head to positionally secure the stretcher on the load supporting deck.

A further aspect of the present invention relates to a transfer assist device for transferring a stretcher carrying a patent from a wheeled gurney to a helicopter loading surface, and from a helicopter loading surface to a wheeled gurney, the transfer assist device comprising: a fixed height frame having a lower frame member and an upper frame member, the lower frame member is generally rectilinear in peripheral configuration and has two opposing parallel and spaced apart end portions formed of beams, and two opposing and spaced apart parallel lateral side portions formed of beams, and the two opposing parallel and spaced apart lateral side portions are longer in a length dimension than the parallel and spaced apart end portions, and the end portion beams and the lateral side portion beams are structurally interconnected to one another at adjacent end portions, and plural cross braces formed of beams extend between the parallel spaced apart lateral side portions, and the upper frame member is generally rectilinear in peripheral configuration and has two opposing parallel and spaced apart end portions formed of beams, and two opposing parallel and spaced apart lateral side portions formed of beams, and the two opposing parallel and spaced apart lateral side portions are longer in a length dimension than the parallel and spaced apart end portions, and the end portion beams and the lateral side portion beams are structurally interconnected to one another at adjacent end portions, and plural cross braces formed of beams extend between the parallel lateral side portions, and the upper frame member is longer in the length dimension than the lower frame member and is structurally interconnected to, and is spaced apart from the lower frame member, by a predetermined fixed height distance, by plural spacedly arrayed frame supports that extend between an upper surface of the lower frame member, and a lower surface of the upper frame member, each of the plural frame supports defining at least one slot for a securing strap to secure the fixed height frame to an upper surface of the wheeled gurney; an adjustment rack having a plurality of spaced apart and upwardly oriented teeth is carried by the upper frame member, adjacent an upper edge of the fixed height frame, and the plurality of spaced apart and upwardly oriented teeth facilitate controllable movement, and positional securement, of a slidably movable bed deck frame relative to the fixed height frame between a first position wherein the slidably movable bed deck frame is positioned above, and substantially centered over, the fixed height frame, and a second extended position wherein the slidably movable bed deck frame is translated along the fixed height frame to extend endwardly outwardly from the first end portion of the fixed height frame; the slidably movable bed deck frame having, two opposing and spaced apart end portions, formed of beams, and two opposing and spaced apart parallel lateral side portions, formed of beams, and each of the two opposing and spaced apart lateral side portions have different lengths dimensions, and the slidably movable bed deck frame is slidably carried by the fixed height frame adjacent above the upper frame member and opposite the lower frame member and, a handle end portion, formed of a beam, extends generally perpendicularly between the two spaced apart and parallel lateral side portions at proximate ends thereof and is structurally interconnected thereto at adjacent end portions, and the handle end portion carries an upwardly extending handle, and a foot end portion formed of a beam, extends between and is structurally interconnected to proximate end portions of the two spaced apart and parallel lateral side portions, opposite the handle end portion, and the foot end portion is not parallel to the handle end portion, and strengthening braces are spacedly arrayed between, and structurally interconnect the spaced apart parallel lateral side portions, and plural wheel brackets carried on an underside of each parallel lateral side portion, and each of the plural wheel brackets support at least one roller wheel on an axle, so that at least one roller wheel rolls along an upper surface of the parallel lateral side portions of the fixed height frame upper frame member, and a generally planar and elongate roller shield is carried by, and depends downwardly from, an underside of the slidably movable bed deck frame adjacent laterally outwardly of the wheel brackets, on each lateral side portion of the slidably movable bed deck frame, each roller shield having a height dimension that is greater than a diameter of the at least one roller wheel, and having a length dimension that is greater than the distance between the plural wheel brackets carried on one lateral side portion of the slidably movable bed deck frame, so as to simultaneously shield the roller wheels of the spaced apart wheel brackets from entanglement, and a latch assembly, with an operator handle, on an underside of the slidably movable bed deck frame to releasably engage with the spaced apart and upwardly oriented teeth of the adjustment rack carried by the fixed height frame, and a generally planar load supporting deck, having a top load supporting surface and an opposing bottom surface, is carried by the slidably movable bed deck frame between the opposing end portions and between the parallel and spaced apart lateral side portions, and a puck receiver is defined in the generally planar load supporting deck generally medially between the opposing parallel and spaced apart lateral side portions and spacedly adjacent the second handle end portion to releasably engage with an outwardly extending puck of the stretcher, the puck receiver having a first angled engagement guide, a second angled engagement guide, a puck anchor head and a puck lock; the first and second angled engagement guides defining receiver opening opposite the anchor head to guide the "puck" carried on the underside of the stretcher into engagement with the puck lock proximate the puck anchor head; and an elongate side rail carried by the slidably movable bed deck frame on plural spacedly arrayed side rail mounting posts adjacent each opposing lateral side portion of the slidably movable bed deck frame and extending parallel to, and spacedly above, the top load supporting surface of the generally planar load supporting deck, each elongate side rail having a first end portion, a spaced apart second end portion, and a side rail rotation frame between the first end portion and the second end portion, the side rail rotation frame structurally carrying a generally planar, and pivotally movable slide rail panel that has a top surface, an opposing bottom surface, a hinge edge and a distal edge, and the slide rail panel is movable between a first locking position wherein the slide rail panel is oriented generally vertically, and generally perpendicular relative to the top load supporting surface of the generally planar load supporting deck providing a physical barrier to retain a patient on the top load supporting surface, and a second position wherein the slide rail panel is oriented generally coplanar with, and spaced laterally adjacent to, the top load supporting surface of the load supporting deck to facilitate movement of the stretcher and patient thereon onto and off of the top load supporting surface, and even to a third position wherein the slide rail panel is pivoted approximately 180 degrees from the first position to extend generally vertically downwardly relative to the top load supporting surface.

A still further aspect of the present invention relates to a transfer assist device and further comprises a second slide member carried by the slider bracket, and spaced apart from the first slide member, and the second slide member simultaneously translates along a bottom surface of the upper frame member lateral side portion of the fixed height frame.

An even still further aspect of the present invention relates to a transfer assist device for transferring a stretcher carrying a patent from a wheeled gurney to a second location, and from a first location to a wheeled gurney, the transfer assist device comprising a fixed height frame having a first end portion, a second end portion, a first lateral side, a second lateral side and a predetermined fixed height dimension between an upper edge portion and a lower edge portion; an adjustment rack, adjacent the upper edge portion of the fixed height frame, that provides controllable movement, and positional securement, of a slidably movable bed deck frame relative to the fixed height frame between a first position wherein the slidably movable bed deck frame is positioned adjacent above, and substantially centered over, the fixed height frame, and a second extended position wherein the slidably movable bed deck frame is translated along the fixed height frame to extend endwardly outwardly from a first end portion of the fixed height frame; the slidably movable bed deck frame is rectangular in peripheral configuration and has a handle end, a foot end, a first lateral side and a second lateral side and the first and second lateral sides are parallel to one another, and are both longer in length dimension than the handle end and the foot end, and the foot end is parallel to the handle end; plural slide brackets structurally carried on an underside of the slidably movable bed deck frame, and each of the plural slide brackets support at least one slide member that translates along the upper edge portion of the fixed height frame so that the slidably movable bed deck frame translates along the fixed height frame; a latch assembly, having an operator handle, on an underside of the slidably movable bed deck frame to controllably engage with the adjustment rack carried by the fixed height frame;

a generally planar load supporting deck carried by the slidably movable bed deck frame between the handle end and the foot end and between the parallel lateral side portions; and a puck receiver is defined in the generally planar load supporting deck between the lateral side portions and spacedly adjacent the handle end portion to releasably engage with an outwardly extending puck carried by the stretcher.

These and other aspects of the present invention are more fully described herein in accordance with the statute

BRIEF DESCRIPTION OF THE DRAWINGS

Preferred embodiments of the invention are described below with reference to the following accompanying drawings.

FIG. 10 is a top plan view of the bed deck frame, less the side rails.

FIG. 11 is an orthographic side view of the bed deck frame.

FIG. 12 is a bottom plan view of the bed deck frame.

FIG. 13 is an isometric bottom, first side and foot end view of the bed deck frame.

FIG. 17 is a top plan view of a second embodiment of the bed deck frame having lateral side portions of the same length, less the side rails.

FIG. 18 is an orthographic side view of the bed deck frame of FIG. 17.

FIG. 19 is a bottom plan view of the bed deck frame of FIG. 17.

FIG. 20 is an isometric bottom, first side and foot end view of the bed deck frame of FIG. 17.

DETAILED DESCRIPTION OF THE PREFERRED EMBODIMENTS

Figure 1:
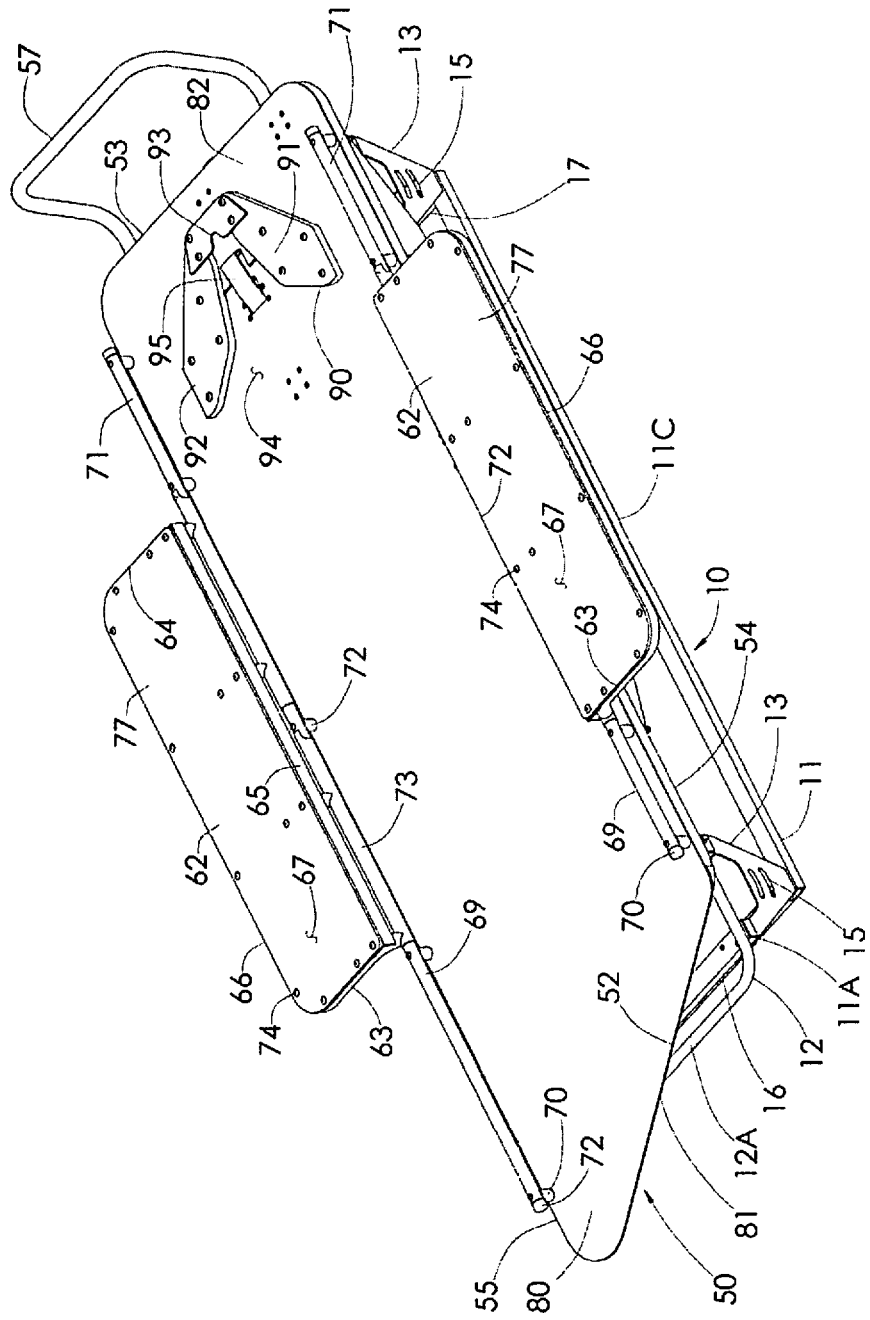
FIG. 1 is an isometric top, foot end and first side view of my transfer assist device shown in a retracted/centered position.

This disclosure of the invention is submitted in furtherance of the constitutional purposes of the U.S. Patent Laws "to promote the progress of science and useful arts" (Article 1, Section 8).

As shown in the accompanying Figures, my transfer assist device provides a fixed height frame 10, supporting a slidably movable bed deck frame 50 that carries a patient supporting deck 80.

The fixed height frame 10 is releasably secured to a known wheeled gurney (not shown). The fixed height dimension raises a carried stretcher (not shown) to a vertical height to allow loading/unloading of a patient and supporting stretcher onto a medical helicopter 100.

The fixed height frame 10 is a rectilinear frame structure having a lower frame member 11 and a spaced apart upper frame member 12. The lower frame member 11 and the upper frame member 12 are formed of beams which may be, but are not limited to, box beams, and/or tubular beams, and/or sheet metal that has been bent into the configuration of a beam. Each of the lower 11 and upper 12 frame members have two opposing parallel end portions 11A, 11B, 12A, 12B and two opposing parallel lateral side portions 11C, 11D, 12C, 12D. The parallel lateral side portions 11C, 11D, 12C, 12D are longer in length dimension than the end portions 11A, 11B, 12A, 12B. The end portions 11A, 11B of the lower frame member 11 are structurally interconnected to the parallel lateral side portions 11C, 11D at the adjacent end portions thereof to form the rectilinear lower frame member 11. Similarly, the end portions 12A, 12B of the upper frame member 12 are structurally interconnected to the parallel lateral side portions 12C, 12D at the adjacent end portions thereof, to form the rectilinear upper frame member 12.

The lower frame member 11, and the upper frame member 12, are structurally interconnected to one another by plural, spacedly arrayed, frame supports 13 that extend between an upper surface of the lower frame member 11 and a bottom surface of the upper frame member 12. The plural spacedly arrayed frame supports 13 provide the fixed/predetermined vertical height dimension which is approximately about twelve inches between the upper 12 and lower 11 frame members. Plural cross braces 14 are spacedly arrayed between, and extend between the parallel lateral side portions 11C, 11D, 12C, 12D of the frame members 11, 12 for strength and rigidity.

An adjustment rack 40 is carried by the upper frame member 12 adjacent an upper edge thereof. The adjustment rack 40 has a plurality of spacedly arrayed, upwardly extending engagement teeth 41 that adjustably engage with a cooperating latch assembly 60 to control movement of, and to positionally secure, a slidably movable bed deck frame 50 carried by the fixed height frame 10.

The slidably movable bed deck frame 50 is extendable outwardly from a first foot end 16 of the fixed height frame 10 and the supporting wheeled gurney (not shown), to facilitate transfer of the stretcher and supported patient to/from the helicopter 100.

Figure 16:
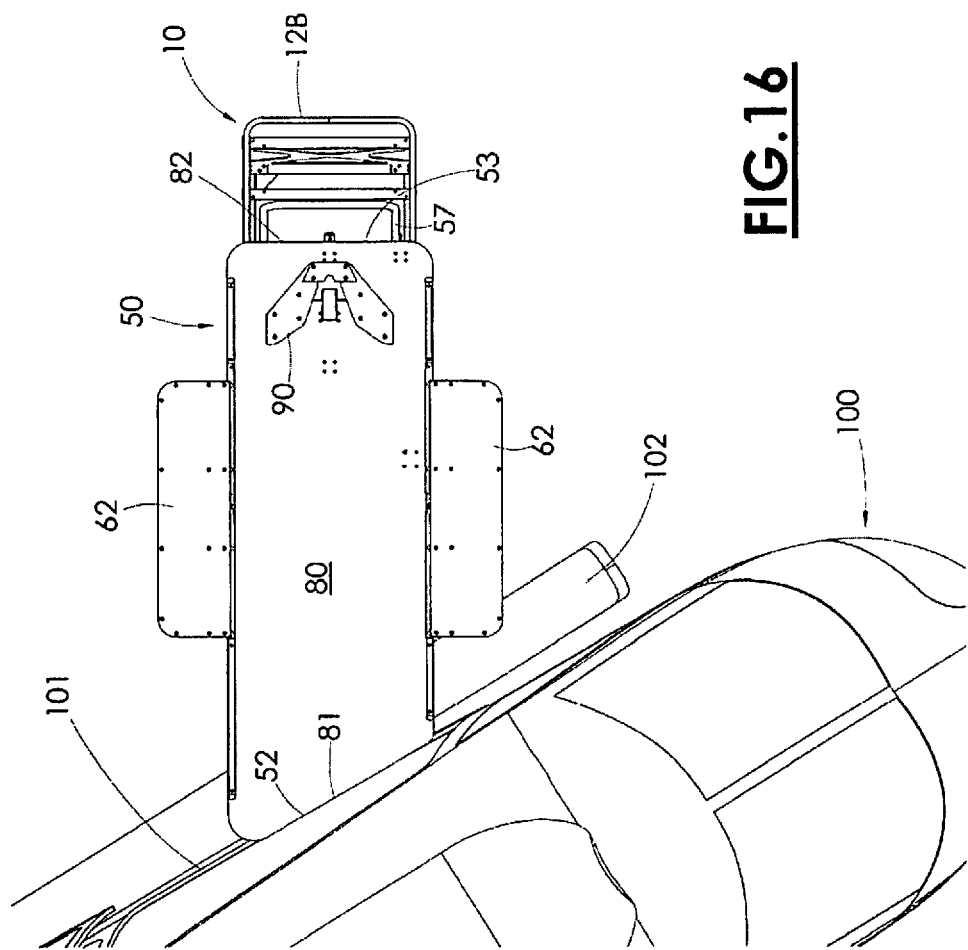
FIG. 16 is a downwardly looking environmental view of the transfer assist device positioned immediately adjacent a helicopter loading door, with the bed deck frame translated to the extended position for patient/stretcher transfer.

The slidably movable bed deck frame 50 has a frame 51 which may be formed of tubular beams, and/or box beams, and/or bent sheet metal. The frame 51 has a foot end 52, a handle end 53, and two opposing and spaced apart parallel side portions 54, 55. Strengthening braces 56 extend between the parallel side portions 54, 55 to provide rigidity and strength. The handle end 53 carries a handle 57 that extends generally perpendicularly upwardly relative to the bed deck frame 50 and is generally perpendicular to the parallel side portions 54, 55. The foot end 52 is opposite, and spaced apart from, the handle end 53 and is angulated. The foot end 52 is preferably not parallel to the handle end 53. As shown in FIG. 16, the angled foot end 53 eases transfer of a supported stretcher/patient (not shown) onto/off of the helicopter 100 by allowing the supporting wheeled gurney (not shown) to be positioned immediately adjacent to the helicopter 100 so that the stretcher may be "slid" onto/off of the helicopter 100 and onto/off of a generally planar load supporting deck 80. The angled foot end portion 53 eliminates the need for medical personnel to physically lift and simultaneously move/translate the stretcher and patient and medical equipment (not shown) from one position to another position and facilitates the "sliding" of the stretcher and patient along a supporting surface while being continuously supported thereon.

Slide brackets 58 are carried on bottom surfaces of the parallel side portions 54, 55 of the bed deck frame 50. The slide brackets 58 carry slide members 59, which are movement means, and may be, but are not limited to linear bearings, slider blocks formed of nylon or UHMD plastic, other known material, or roller wheels on axles so that the bed deck frame 50 freely translates along the side members 12C, 12D of the upper frame member 12 of the fixed height frame 10. The slide members 59 may be positioned adjacent above the side members 12C, 12D of the upper frame member 12 so that the bed deck frame 50 is supported thereon, and slide members 59 may be positioned adjacent below the side members 12C, 12D of the upper frame member 12 so that the bed deck frame 50 cannot be lifted from/vertically detached from the fixed height frame 10. In the preferred embodiment, slide members 59 are positioned both immediately above, and immediately below the side members 12C, 12D of the upper frame member 12.

Figure 2:
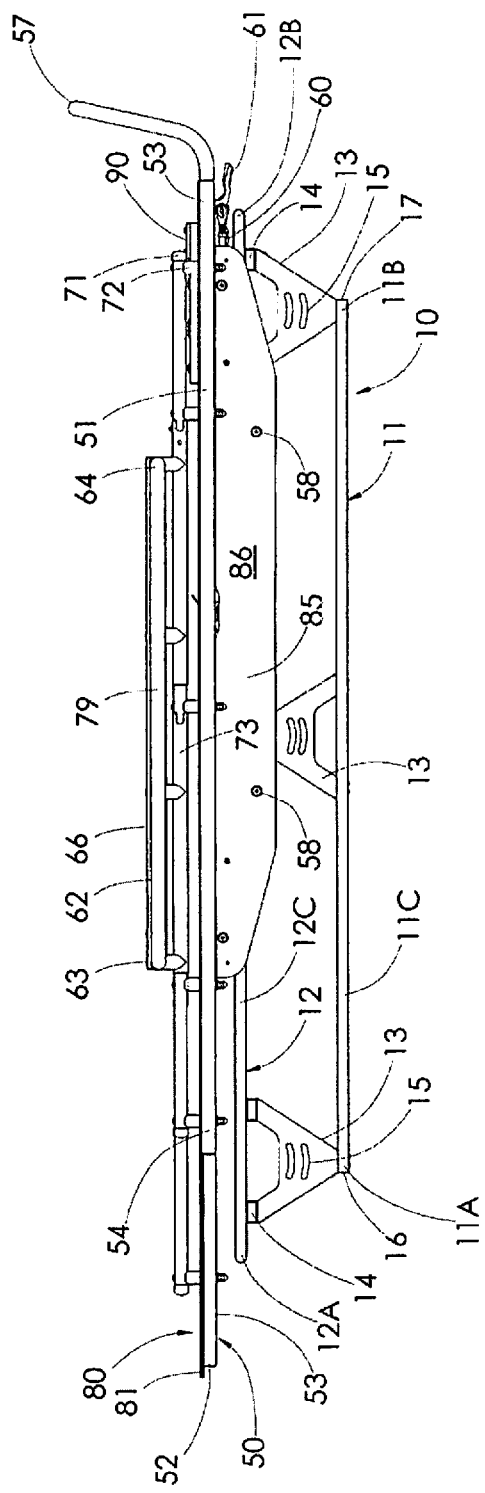
FIG. 2 is an orthographic first side view thereof showing the fixed height frame and the vertical height dimension provided by my transfer assist device.
Figure 3:
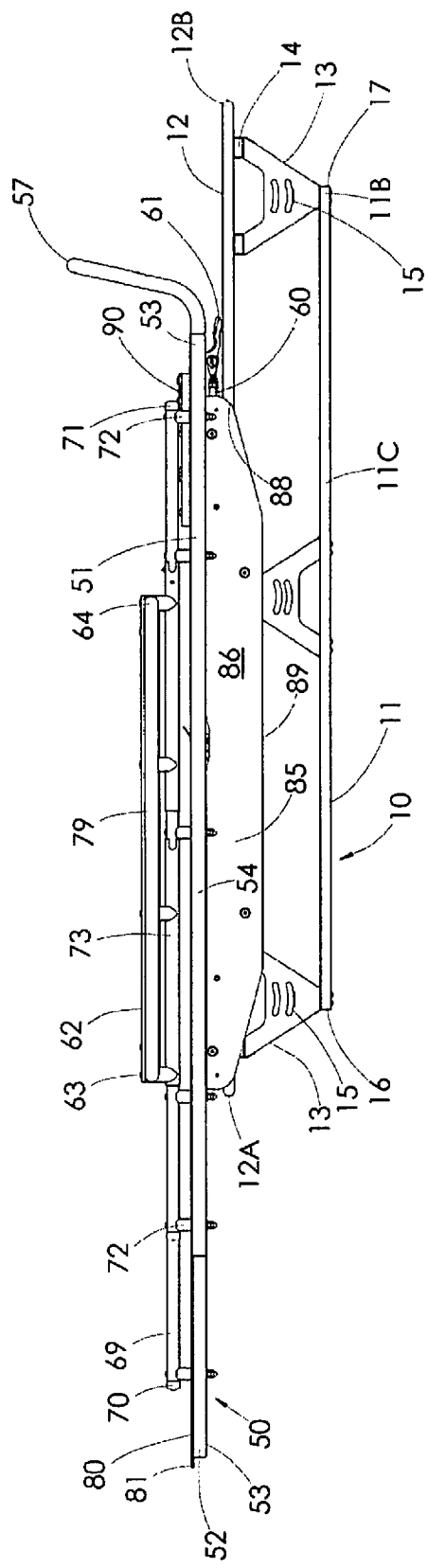
FIG. 3 is an orthographic first side view, similar to that of FIG. 2, showing my transfer assist device is an extended position to facilitate a patient/stretcher transfer.
Figure 4:
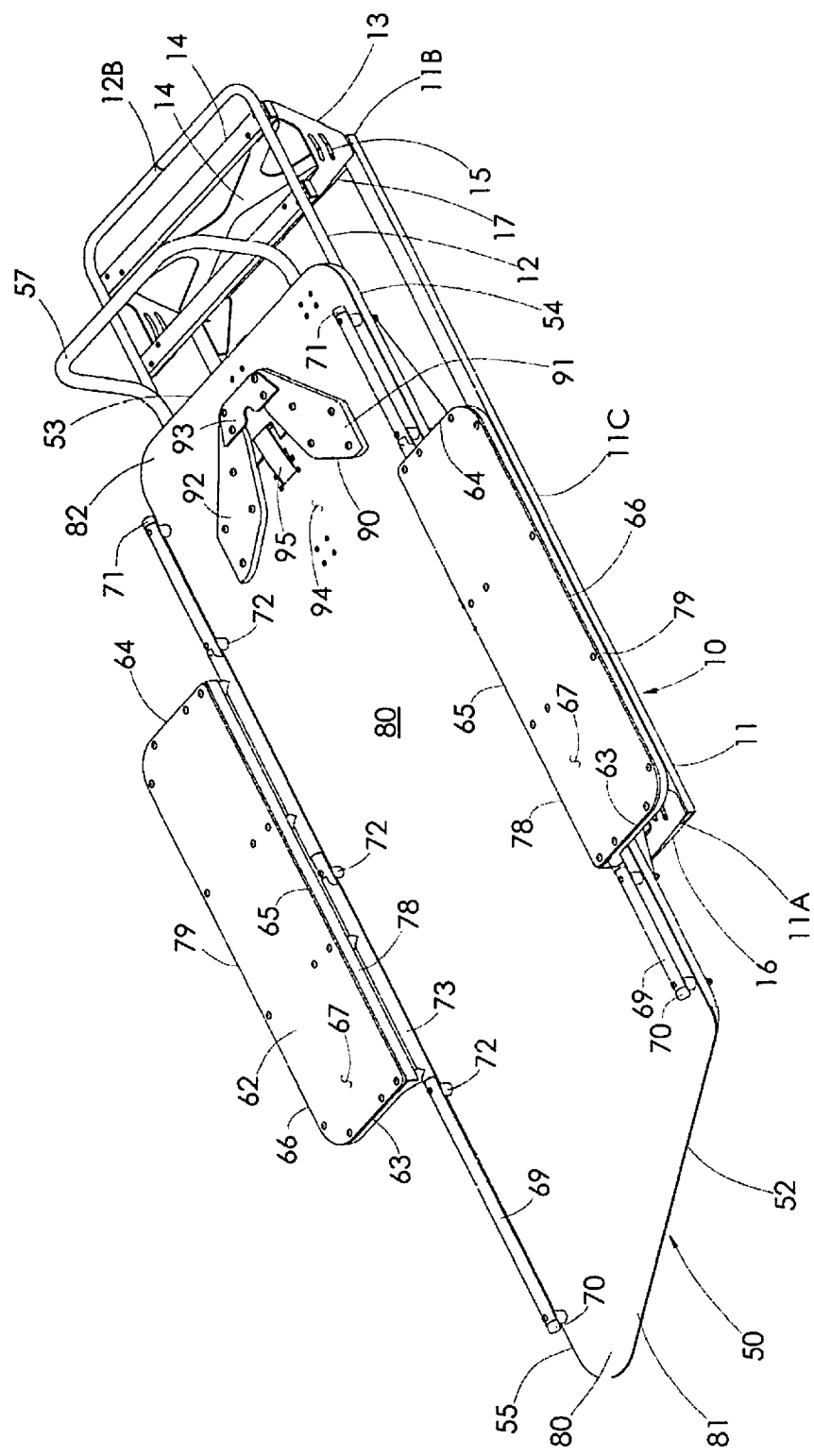
FIG. 4 is an isometric top, foot end and first side view similar to that of FIG. 1, showing the bed deck frame extended relative to the fixed height frame.
Figure 5:
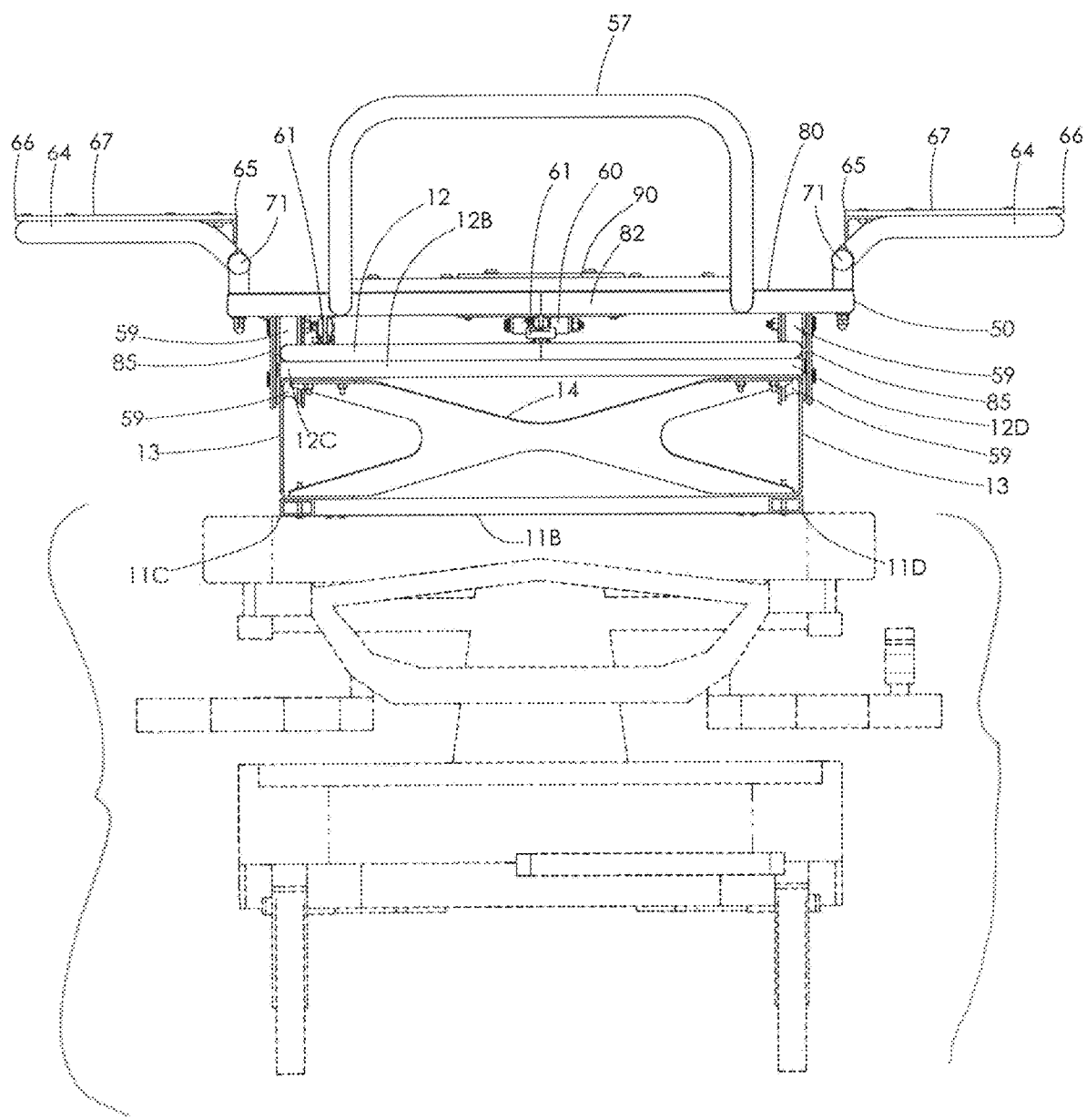
FIG. 5 is an orthographic handle end view of my transfer assist device.
Figure 6:
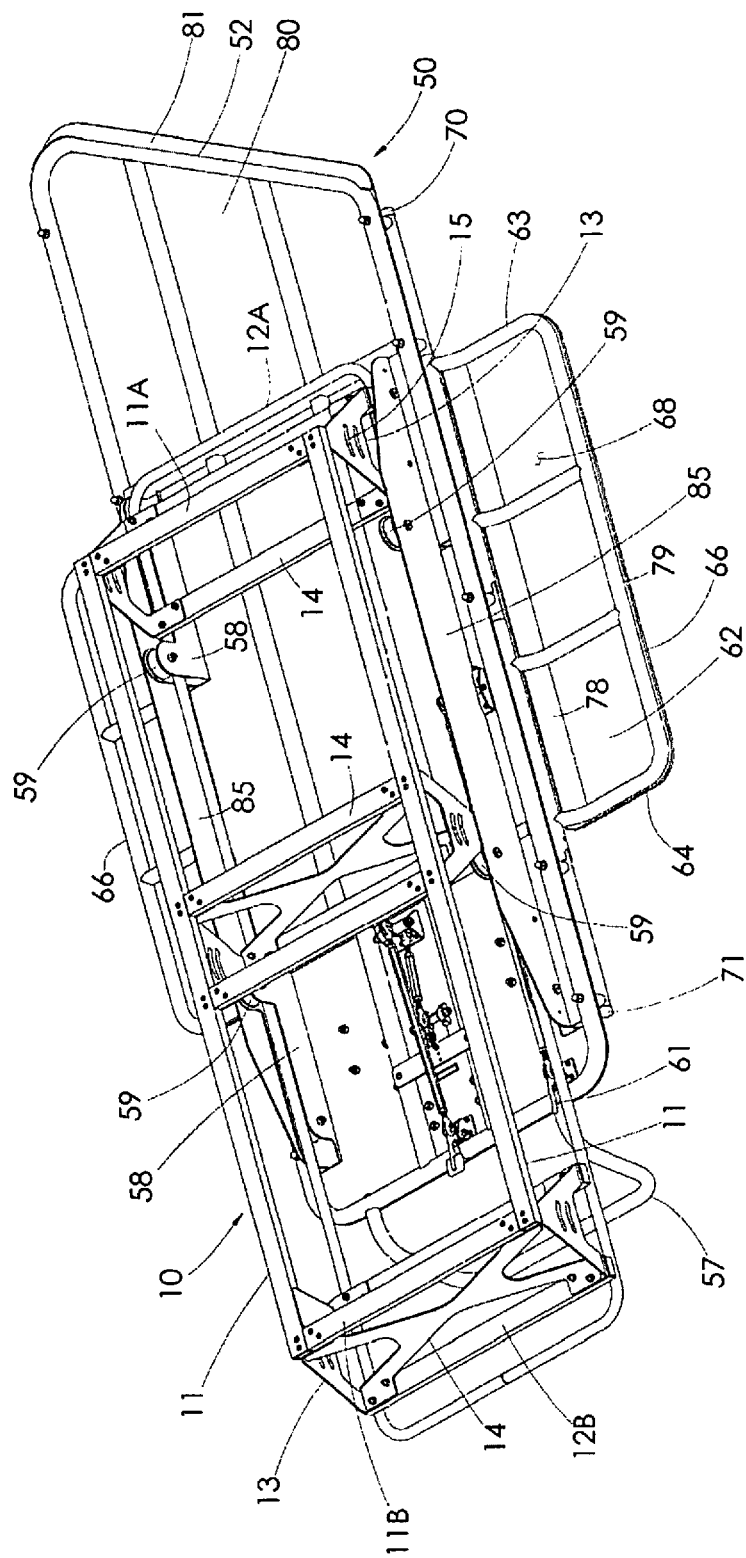
FIG. 6 is an isometric, bottom, handle end, and first side view of my transfer assist device in an extended position.
Figure 9:
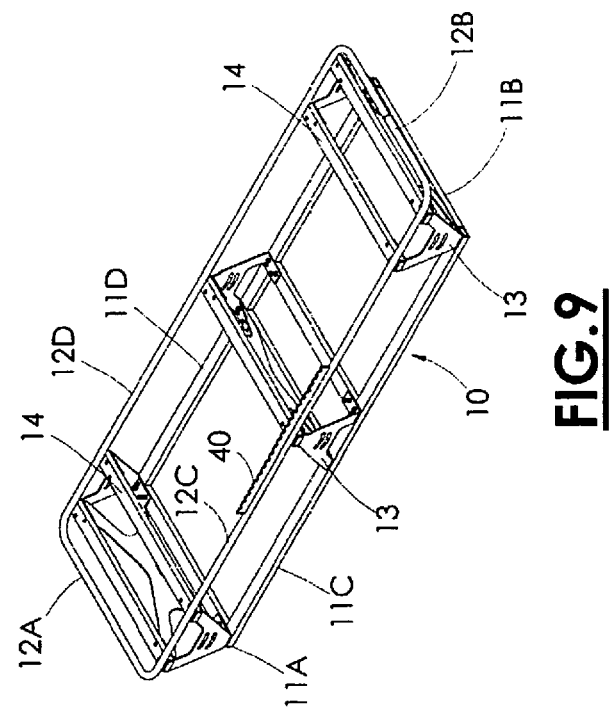
FIG. 9 is an isometric top, first side and handle end view of the fixed height frame showing the details thereof.
Figure 7:
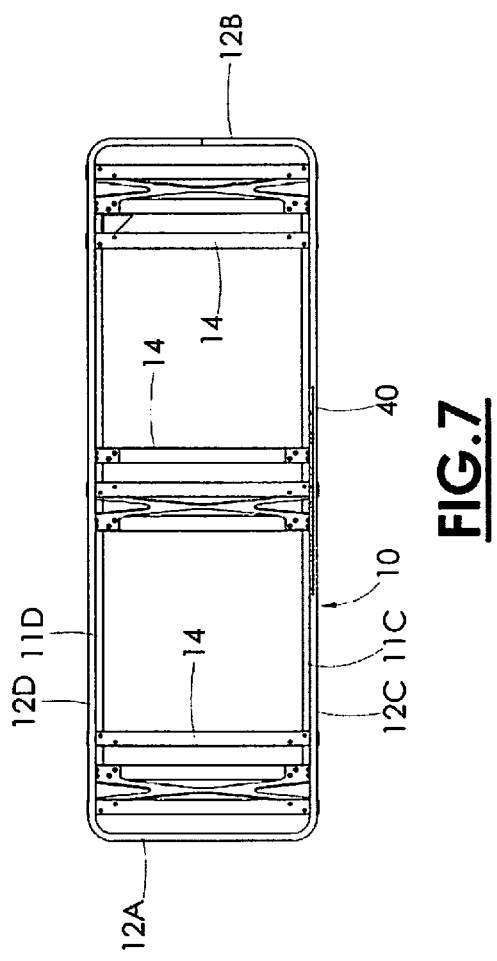
FIG. 7 is a top plan view of the fixed height frame, less the bed deck frame, showing the details thereof.
Figure 8:
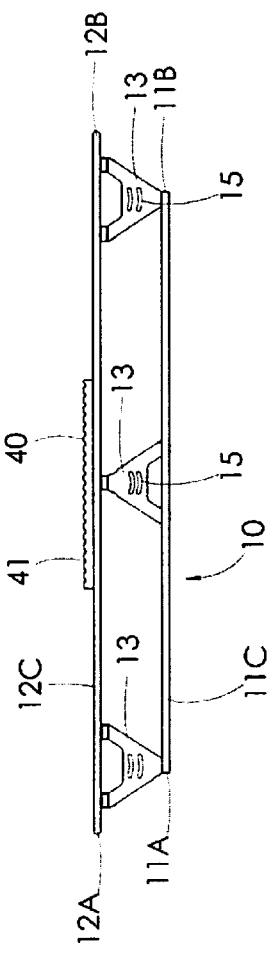
FIG. 8 is an orthographic side view of the fixed height frame showing the details thereof.

A latch assembly 60 is carried on the underside of the bed deck frame 50 and is configured to releasably engage with the adjustment rack 40 carried by the fixed height frame 10. A handle 61 controls operation of the latch assembly 60 and an operator, using a handle 61 can optionally engage/disengage the latch assembly 60 from the adjustment rack 40. When disengaged, the bed deck frame 50 can freely translate along the fixed height frame 10 between a first centered position (FIG. 2) to a second extended position (FIG. 3). In the first centered position (FIG. 2), the bed deck frame 50 is generally centered upon the fixed height frame 10 and centered upon the supporting wheeled gurney (not shown). In the second extended position (FIG. 3), the bed deck frame 50 extends a distance of approximately twenty-two inches endwardly from the fixed height frame 10 in the direction of the foot end 52 of the bed deck frame 50. The bed deck frame 50 need not extend its full/entire movable range in use situations where a lesser extension is sufficient. The bed deck frame 50 may be positionally secured, using the latch assembly 60, at a plurality of positions that are less than full extension of the bed deck frame 50 relative to the fixed height frame 10. The endwardly extension of the bed deck frame 50 facilitates transfer of the stretcher/patient from the invention onto/off of the helicopter 100 even when the wheeled gurney (not shown) is prevented from moving closely to the helicopter because of the helicopter skids/structure. (See FIG. 16).

A generally planar load supporting deck 80 is carried by, and secured to, the bed deck frame 50 between the foot end 52 and the handle end 53 and between the parallel lateral side portions 54, 55. The load supporting deck 80 is comprised of a material that is not absorbent, easily cleanable, and is "slippery" so that a stretcher (not shown) may easily slide thereon and therealong. The load supporting deck 80 is dimensioned and configured to be large enough to also support medical equipment (not shown) that may be "attached" to the patient and necessary during the transport, such as, but not limited to respirators, IV fluid racks and the like.

A puck receiver 90 is defined in the load supporting deck 80 generally medially between the opposing parallel lateral side portions 54, 55 and the spacedly adjacent the handle end portion 53. The puck receiver 90 is designed and configured to releasably engage with an outwardly extending puck (not shown) that is an integral component of many patient stretchers used in medical helicopters 100. Puck receivers are carried in many medical helicopters to secure a stretcher to the helicopter loading surface therein. The puck receiver 90, has a spring biased lock 95, that when in an unlocked position, is planar with a top surface of the load supporting deck 80. When the puck (not shown) carried on a bottom surface of the stretcher (not shown) passes through puck receiver opening 94, guided by first and second engagement guides 91, 92 and into engagement with puck anchor head 93, an operator may activate a handle that releases the spring biased lock 95 which moves the lock 95 into engagement with the puck (not shown) to prevent the puck (and the attached stretcher—not shown) from moving or disengaging from the puck receiver 90 until the spring biased lock 95 is released by an operator.

In use, the fixed height frame 10, and the bed deck frame 50, are supported by, and secured to a standard wheeled gurney on an upper surface thereof. The fixed height frame 10 may be attached to the gurney by means of flexible straps (not shown) that communicate between the fixed height frame 10 and the gurney. In one contemplated embodiment, the frame supports 13 define through slots 15 configured to receive fastening straps (not shown). The fixed height frame 10 provides an additional approximately 12-inch height to the standard wheeled gurney.

A further aspect of the present invention relates to a transfer assist device for transferring a stretcher (not shown) carrying a patient from a wheeled gurney (not shown) to a helicopter 100 loading surface, and from a helicopter 100 loading surface to a wheeled gurney, the transfer assist device comprising: a fixed height frame 10 having a lower frame member 11 and an upper frame member 12.

The lower frame member 11 is generally rectilinear in peripheral configuration and has two opposing parallel and spaced apart end portions 11A, 11B formed of beams, and two opposing and spaced apart parallel lateral side portions 11C, 11D formed of beams, and the two opposing parallel and spaced apart lateral side portions 11C, 11D are longer in a length dimension than the parallel and spaced apart end portions 11A, 11B, and the end portion beams 11A, 11B and the lateral side portion beams 11C, 11D are structurally interconnected to one another at adjacent end portions, and plural cross braces 14 extend between the parallel spaced apart lateral side portions 11C, 11D.

The upper frame member 12 is generally rectilinear in peripheral configuration and has two opposing parallel and spaced apart end portions 12A, 12B formed of beams, and two opposing parallel and spaced apart lateral side portions 12C, 12D formed of beams, and the two opposing parallel and spaced apart lateral side portions 12C, 12D are longer in a length dimension than the parallel and spaced apart end portions 12A, 12B, and the end portion beams 12A, 12B and the lateral side portion beams 12C, 12D are structurally interconnected to one another at adjacent end portions, and plural cross braces 14 extend between the parallel lateral side portions 12C, 12D, and the upper frame member 12 is longer in the length dimension than the lower frame member 11. The upper frame member 12 is structurally interconnected to, and is spaced apart from the lower frame member 11, by a predetermined fixed height distance, by plural spacedly arrayed frame supports 13 that extend between an upper surface of the lower frame member 11, and a lower surface of the upper frame member 12. Each of the plural frame supports 13 defines at least one slot 15 for a securing strap (not shown) to secure the fixed height frame 10 to an upper surface (not shown) of the wheeled gurney (not shown).

An adjustment rack 40 having a plurality of spaced apart and upwardly oriented teeth 41 is carried by the upper frame member 12, adjacent an upper edge of the fixed height frame 10, and the plurality of spaced apart and upwardly oriented teeth 41 facilitate controllable movement, and positional securement, of a slidably movable bed deck frame 50 relative to the fixed height frame 10 between a first centered position (FIG. 2) wherein the slidably movable bed deck frame 50 is positioned above, and substantially centered over, the fixed height frame 10, and a second extended position (FIG. 3) wherein the slidably movable bed deck frame 50 is translated along the fixed height frame 10 to extend endwardly outwardly from the first end portion 11A, 12A of the fixed height frame 10.

The slidably movable bed deck frame 50 has two opposing and spaced apart end portions 52, 53, formed of beams, and two opposing and spaced apart parallel lateral side portions 54, 55, formed of beams. In one preferred embodiment, length dimension of the first lateral side portion 54 is different than the length dimension of the second lateral side portion 55 so that the foot end 52 of the bed deck frame 50 is angulated relative to the handle end portion 53. In a second contemplated embodiment, the lateral side portions 54, 55 have the same length dimension so that the bed deck frame 50 is generally rectilinear in configuration.

The slidably movable bed deck frame 50 is slidably carried by the fixed height frame 10 immediately adjacent above the upper frame member 12 and opposite the lower frame member 11.

A handle end portion 53, formed of a beam, extends generally perpendicularly between the two spaced apart and parallel lateral side portions 54, 55 at proximate ends thereof and is structurally interconnected thereto at adjacent end portions. The handle end portion 53 carries an upwardly extending handle 57. A foot end portion 52 formed of a beam, extends between and is structurally interconnected to proximate end portions of the two spaced apart and parallel lateral side portions 54, 55, opposite the handle end portion 53. The foot end portion 52 is preferably not parallel to the handle end portion 53. Strengthening braces 56 are spacedly arrayed between, and structurally interconnect the spaced apart parallel lateral side portions 54, 55.

Plural spacedly arrayed slider brackets 58 are carried on an underside of each parallel lateral side portion 54, 55, and each of the plural slider brackets 58 support at least one slide member 59, which may be, but is not limited to, a linear bearing, a slider block formed of Teflon or nylon or UHMW, or other known material, or a roller wheel on an axle. The slide members 59 slide and/or roll along an upper surface of the parallel lateral side portions 54, 55 of the fixed height frame 10 upper frame member 12.

A generally planar and elongate roller shield 85 is carried by, and depends downwardly from, an underside of the slidably movable bed deck frame 50 adjacent laterally outwardly of the slider brackets 58, spacedly adjacent each lateral side portion 54, 55 of the slidably movable bed deck frame 50, each roller shield 85 has a top to bottom height dimension that is greater than a diameter of the slide member 59, and has a length dimension (end to end) that is greater than the distance between the plural slider brackets 58 carried on one lateral side portion 54, 55 of the slidably movable bed deck frame 50, so as to simultaneously shield the slide members 59 of the spaced apart slider brackets 58 from entanglement, and to prevent unintentional injury to a user.

A latch assembly 60, with an operator handle 61 is carried on an underside of the slidably movable bed deck frame 50, and the latch assembly 60 releasably engages with the spaced apart and upwardly oriented teeth 41 of the adjustment rack 40 carried by the fixed height frame 10.

A generally planar load supporting deck 80, having a top load supporting surface and an opposing bottom surface, is carried by the slidably movable bed deck frame 50 between the foot end 52 and the handle end 53 and between the parallel and spaced apart lateral side portions 54, 55.

Figure 15:
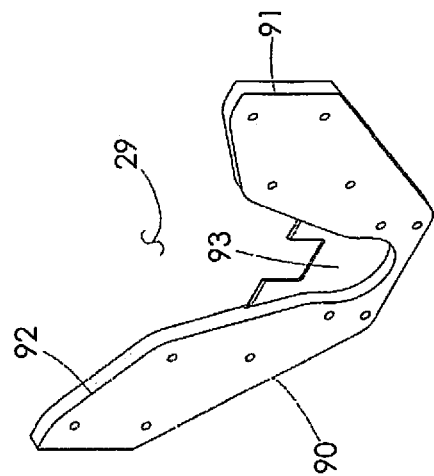
FIG. 15 is an isometric view of the puck receiver showing the receiver opening.
Figure 14:
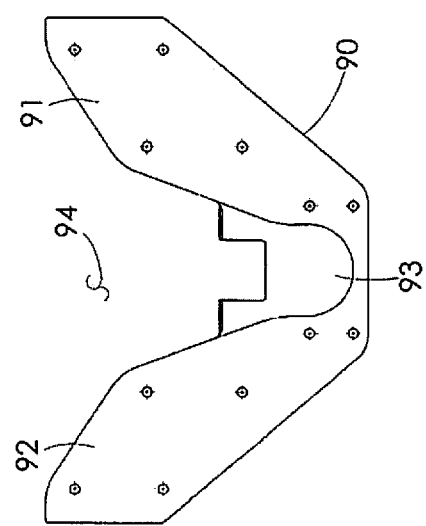
FIG. 14 is a top plan view of the puck receiver.

A puck receiver 90 is defined in the generally planar load supporting deck 80 generally medially between the opposing parallel and spaced apart lateral side portions 54, 55 and spacedly adjacent the handle end portion 53 to releasably engage with an outwardly extending puck (not shown) of the stretcher (not shown). As shown in FIGS. 14, 15 the puck receiver 90 has a first angled engagement guide 91, a second angled engagement guide 92, a puck anchor head 93 and a puck lock 95. The first and second angled engagement guides 91, 92 define a receiver opening 94 opposite the anchor head 93 to guide the puck (not shown) carried on the underside of the stretcher (not shown) into engagement with the puck lock 95 proximate the puck anchor head 93.

An elongate side rail 69 is carried by the slidably movable bed deck frame 50 adjacent each opposing lateral side portion 54, 55 on plural spacedly arrayed side rail mounting posts 72. Each side rail 69 extends between the foot end 52, and the handle end 53, and is parallel to and spacedly above, the generally planar load supporting deck 80. Each elongate side rail 69 has a first end portion 70, a spaced apart second end portion 71, and a side rail rotation frame 73 between the first end portion 71 and the second end portion 72. The side rail rotation frame 73 rotates axially relative to the side rail 69. The side rail rotation frame 73 carries a generally planar, and pivotally movable slide rail panel 62. Each slide rail panel 62 has a first end portion 63, a second end portion 64, an inner side portion 65, a laterally outer side portion 66, a top surface 67, an opposing bottom surface 68, a hinge edge 78 and a distal edge 79 that is opposite the load supporting deck 80.

Each slide rail panel 62 is movable relative to the load supporting deck 80 between a first locking position wherein the slide rail panel 62 is oriented generally vertically, and generally perpendicular relative to the generally planar load supporting deck 80 providing a physical barrier to retain a patient on the load supporting deck 80, and a second position wherein the slide rail panel is oriented generally coplanar with, and spaced laterally adjacent to, the load supporting deck 80 to facilitate movement of the stretcher and patient thereon, onto and off of the load supporting deck 80, and to a laterally adjacent surface, such as the surgery table or another wheeled gurney. Because the slide rail panel 62 is pivotal to a generally horizontal position, this slide rail panel 62 can provide a "bridge" between two spacedly adjacent surfaces, such as, but not limited to, to adjacent gurneys so that the stretcher and patient may be moved therebetween safely, and always providing a "structure" between the adjacent surfaces to prevent the stretcher and patient from inadvertently falling therebetween.

Having described the structure of my gurney transfer assist device, its operation is briefly described.

OPERATION

Operation of the currently disclosed invention is believed to be readily apparent from the above detailed written description, however a brief description of the operation of the instant invention is nevertheless provided below.

When moving a patient, upon a stretcher, onto/off of a medical helicopter 100, the wheeled gurney (not shown) is positioned as close as possible to an open helicopter door. Typically, helicopter skids 102 which extend laterally outwardly from the bottom of the helicopter 100 prevent the wheeled gurney from being positioned immediately adjacent the helicopter door. (See FIG. 16). Once the wheeled gurney is positioned as close as possible to the helicopter 100 which may be immediately adjacent the helicopter skid 102, the medical personnel may disengage the latch assembly 60, using a handle 61 and may slide/translate the bed deck frame 50, (carrying the stretcher and patient and attached medical equipment) toward the second extended position (FIG. 3) whereupon the foot end 53 of the bed deck frame 50 physically contacts the helicopter loading surface. The wheeled gurney may be oriented angularly relative to the helicopter 100 such that a corner portion of the stretcher carrying the patient is positioned directly upon the helicopter loading surface. (This orientation is facilitated by the angular configuration of the bed deck 50).

Medical personnel (and/or others) may position themselves immediately adjacent the helicopter door and assist in the transfer to/from the helicopter 100. In one possible instance, such as, but not limited to, when the patient needs immediate and continuous attention from more than two medical personnel (such as to stabilize a broken neck or perform continuous chest compressions) the angulation of the foot end portion 53 of the bed deck frame 50 allows more than only two medical personnel to have "hands on" the patient throughout the transfer—the available space is greater. The stretcher (not shown) carrying the patient is thereupon slidably moved along the extended/translated load supporting deck 80 and onto the helicopter loading surface or off of the helicopter loading surface without any lifting of the stretcher and/or patient while allowing the medical personnel to stand upon the underlying supporting ground surface.

In its broadest aspect, the present invention relates to a gurney transfer assist device for transferring a stretcher carrying a patent from a wheeled gurney to a second location, and from a first location to a wheeled gurney, the transfer assist device comprising: a fixed height frame 10 having a first foot end portion 11A, 12A, a second handle end portion 11B, 12B, a first lateral side 11C, 12C, a second lateral side 11D, 12D and a predetermined height dimension between an upper frame member 12 and a lower frame member 11; an adjustment rack 40, adjacent the upper edge portion of the fixed height frame 10, that provides controllable movement, and positional securement, of a slidably movable bed deck frame 50 relative to the fixed height frame 10 between a first centered position wherein the slidably movable bed deck frame 50 is positioned adjacent above, and substantially centered over, the fixed height frame 10, and a second extended position wherein the slidably movable bed deck frame 50 is translated along the fixed height frame 10 to extend endwardly outwardly from a first foot end portion 11A, 12A of the fixed height frame 10; the slidably movable bed deck frame 50 is quadrilateral in peripheral configuration and has a handle end 53, a foot end 52, a first shorter lateral side 54 and a second longer lateral side 55 and the first and second lateral sides 54, 55 are parallel to one another, and are both longer in length dimension than the handle end 53 and the foot end 52, and the foot end 52 is not parallel to the handle end 53; plural slide brackets 58 are structurally carried on an underside of the slidably movable bed deck frame 50, and each of the plural slide brackets 58 support at least one slide member 59 that freely translates along the upper edge portion of the fixed height frame 10 so that the slidably movable bed deck frame 50 translates along the fixed height frame 10; a latch assembly 60, having an operator handle 61 is carried on an underside of the slidably movable bed deck frame 50 to controllably engage with the adjustment rack 40 carried by the fixed height frame 10; a generally planar load supporting deck 80 is carried by the slidably movable bed deck frame 50 between the handle end 53 and the foot end 52 and between the parallel lateral side portions 54, 55; and a puck receiver 90 is defined in the generally planar load supporting deck 80 between the lateral side portions 83, 84 and spacedly adjacent the handle end portion 82 to releasably engage with an outwardly extending puck carried by the stretcher.

A further aspect of the present invention relates to a transfer assist device that has an elongate side rail 69 carried by the slidably movable bed deck frame 50 on plural spacedly arrayed side rail mounting posts 72 adjacent each opposing lateral side portion 83, 84 of the slidably movable bed deck frame 50 and extending parallel to, and spacedly above the load supporting deck 80, each elongate side rail 69 having a first end portion 70, a spaced apart second end portion 71, and a side rail rotation frame 73 between the first end portion 70 and the second end portion 71, the rotation frame 73 structurally carrying a generally planar, and pivotally movable slide rail panel 62 that has a first end portion 63, a second end portion 64, an inner side portion 65, a laterally outer side portion 66, a top surface 67, an opposing bottom surface 68, a hinge edge 78 and a distal edge 79, and the slide rail panel 62 is movable between a first locking position wherein the slide rail panel 62 is oriented generally vertically, and generally perpendicular relative to the load supporting deck 80 providing a physical barrier to retain a patient on the load supporting deck 80, and a second position wherein the slide rail panel 62 is oriented generally coplanar with, and spaced laterally adjacent to, the load supporting deck 80 to facilitate movement of the stretcher and patient thereon onto and off of the load supporting deck.

A further aspect of the present invention relates to a transfer assist device and further comprises an operator controllable locking mechanism carried by the generally planar slide rail panel 62 that positionally secures the slide rail panel 62 in a desired position relative to the load supporting deck 80.

A further aspect of the present invention relates to a transfer assist device and further comprises a generally planar and elongate roller shield 85 carried by, and depending downwardly from, an underside of the slidably movable bed deck frame 50 adjacent laterally outwardly of the plural slider brackets 58, each roller shield having a height dimension that is greater than a diameter of the at least one slide member 59, and having a length dimension that is greater than a distance between the plural slider brackets 58 carried on one lateral side portion 54, 55 of the slidably movable bed deck frame 50, to simultaneously shield the slide members 59 of the spaced apart slider brackets 58 from entanglement.

A further aspect of the present invention relates to a transfer assist device and wherein the second location is an aircraft patient supporting surface.

A further aspect of the present invention relates to a transfer assist device and wherein the first location is an aircraft patient supporting surface.

A further aspect of the present invention relates to a transfer assist device and wherein the fixed height frame 10 has a lower frame member 11 and an upper frame member 12.

A further aspect of the present invention relates to a transfer assist device and wherein the lower frame 11 member is generally rectilinear in peripheral configuration and has two opposing parallel and spaced apart end portions 11A, 11B formed of beams, and two opposing and spaced apart parallel lateral side portions 11C, 11D formed of beams, and the two opposing parallel and spaced apart lateral side 11C, 11D portions are longer in a length dimension than the parallel and spaced apart end portions 11A, 11B, and the end portion beams 11A, 11B and the lateral side portion beams 11C, 11D are structurally interconnected to one another at adjacent end portions, and plural cross braces 14 formed of beams extend between the parallel spaced apart lateral side portions 11C, 11D; and the upper frame member 12 is generally rectilinear in peripheral configuration and has two opposing parallel and spaced apart end portions 12A, 12B formed of beams, and two opposing parallel and spaced apart lateral side portions 12C, 12D formed of beams, and the two opposing parallel and spaced apart lateral side portions 12C, 12D are longer in a length dimension than the parallel and spaced apart end portions 12A, 12B, and the end portion beams 12A, 12B and the lateral side portion beams 12C, 12D are structurally interconnected to one another at adjacent end portions, and plural cross braces 14 formed of beams extend between the parallel lateral side portions 12C, 12D; and the upper frame member 12 is longer in the length dimension than the lower frame member 11 and is structurally interconnected to, and is spaced apart from the lower frame member, by a predetermined fixed height distance, by plural spacedly arrayed frame supports 13 that extend between an upper surface of the lower frame member 11, and a lower surface of the upper frame member 12, and the fixed height frame 10 is secured to an upper surface of the wheeled gurney (not shown) with straps.

A further aspect of the present invention relates to a transfer assist device and wherein the fixed height frame 10 is formed, at least partially, of box beams, and/or at least partially of tubular beams, and/or at least partially of sheet metal.

A further aspect of the present invention relates to a transfer assist device and wherein the slide member 59 is a roller wheel carried on an axle.

A further aspect of the present invention relates to a transfer assist device and wherein the adjustment rack 40 is elongate and has a plurality of spaced apart and upwardly oriented teeth 41 and is carried by the fixed height frame 10, adjacent an upper edge of the fixed height frame 10, and the plurality of spaced apart and upwardly oriented teeth 41 releasably and controllable engage with the latch assembly 60 to facilitate controllable movement, and positional securement, of the slidably movable bed deck frame 50 relative to the fixed height frame 10 between a first position wherein the slidably movable bed deck frame 50 is positioned above, and substantially centered over, the fixed height frame 10, and a second extended position wherein the slidably movable bed deck frame 50 is translated along the fixed height frame 10 to extend endwardly outwardly from the foot end portion 11A, 12A of the fixed height frame 10.

A further aspect of the present invention relates to a transfer assist device and wherein the slidably movable bed deck frame 50 has, two opposing and spaced apart end portions 52, 53, formed of beams, and two opposing and spaced apart parallel lateral side portions 54, 55, formed of beams, and each of the two opposing and spaced apart lateral side portions 54, 55 have different length dimensions, and the slidably movable bed deck frame 50 is slidably carried by the fixed height frame 10; a handle end portion 53, formed of a beam, extends generally perpendicularly between the two spaced apart and parallel lateral side portions 54, 55 at proximate ends thereof and is structurally interconnected thereto at adjacent end portions, and the handle end portion 53 carries an upwardly extending handle 57; a foot end portion 52 formed of a beam, extends between and is structurally interconnected to proximate end portions of the two spaced apart and parallel lateral side portions 54, 55, opposite the handle end portion 53, and the foot end portion 52 is not parallel to the handle end portion 53; and strengthening braces 56 are spacedly arrayed between, and structurally interconnect the spaced apart parallel lateral side portions 54, 55.

A further aspect of the present invention relates to a transfer assist device and wherein the puck receiver 90 has a first angled engagement guide 91, a second angled engagement guide 92, a puck anchor head 93 and a puck lock 95, and the first and second angled engagement guides 91, 92 define a receiver opening 94 opposite the anchor head 93 to guide the puck (not shown) carried on the underside of the stretcher (not shown) into engagement with the puck lock 95 proximate the puck anchor head 93 to positionally secure the stretcher on the load supporting deck 80.

A further aspect of the present invention relates to a transfer assist device for transferring a stretcher carrying a patent from a wheeled gurney to a helicopter loading surface, and from a helicopter loading surface to a wheeled gurney, the transfer assist device comprising: a fixed height frame 10 having a lower frame member 11 and an upper frame member 12, the lower frame member 11 is generally rectilinear in peripheral configuration and has two opposing parallel and spaced apart end portions 11A, 11B formed of beams, and two opposing and spaced apart parallel lateral side portions 11C, 11D formed of beams, and the two opposing parallel and spaced apart lateral side portions 11C, 11D are longer in a length dimension than the parallel and spaced apart end portions 11A, 11B, and the end portion beams 11A, 11B and the lateral side portion beams 11C, 11D are structurally interconnected to one another at adjacent end portions, and plural cross braces 14 formed of beams extend between the parallel spaced apart lateral side portions 11C, 11D, and the upper frame member 12 is generally rectilinear in peripheral configuration and has two opposing parallel and spaced apart end portions 12A, 12B formed of beams, and two opposing parallel and spaced apart lateral side portions 12C, 12D formed of beams, and the two opposing parallel and spaced apart lateral side portions 12C, 12D are longer in a length dimension than the parallel and spaced apart end portions 12A. 12B, and the end portion beams 12A, 12B and the lateral side portion beams 12C, 12D are structurally interconnected to one another at adjacent end portions, and plural cross braces 14 formed of beams extend between the parallel lateral side portions 12C, 12D, and the upper frame member 12 is longer in the length dimension than the lower frame member 11 and is structurally interconnected to, and is spaced apart from the lower frame member 11, by a predetermined fixed height distance, by plural spacedly arrayed frame supports 13 that extend between an upper surface of the lower frame member 11, and a lower surface of the upper frame member 12, each of the plural frame supports 13 defining at least one slot 15 for a securing strap (not shown) to secure the fixed height frame 10 to an upper surface of the wheeled gurney; an adjustment rack 40 having a plurality of spaced apart and upwardly oriented teeth 41 is carried by the upper frame member 12, adjacent an upper edge of the fixed height frame 10, and the plurality of spaced apart and upwardly oriented teeth 41 facilitate controllable movement, and positional securement, of a slidably movable bed deck frame 50 relative to the fixed height frame 10 between a first position wherein the slidably movable bed deck frame 50 is positioned above, and substantially centered over, the fixed height frame 10, and a second extended position wherein the slidably movable bed deck frame 50 is translated along the fixed height frame 10 to extend endwardly outwardly from the foot end portion 16 of the fixed height frame 10; the slidably movable bed deck frame 50 having, two opposing and spaced apart end portions 52, 53, formed of beams, and two opposing and spaced apart parallel lateral side portions 54, 55, formed of beams, and each of the two opposing and spaced apart lateral side portions 54, 55 have different length dimensions, and the slidably movable bed deck frame 50 is slidably carried by the fixed height frame 10 adjacent above the upper frame member 12 and opposite the lower frame member 11 and, a handle end portion 53, formed of a beam, extends generally perpendicularly between the two spaced apart and parallel lateral side portions 54, 55 at proximate ends thereof and is structurally interconnected thereto at adjacent end portions, and the handle end portion 53 carries an upwardly extending handle 57, and a foot end portion 52 formed of a beam, extends between and is structurally interconnected to proximate end portions of the two spaced apart and parallel lateral side portions 54, 55, opposite the handle end portion 53, and the foot end portion 52 is not parallel to the handle end portion 53, and strengthening braces 56 are spacedly arrayed between, and structurally interconnect the spaced apart parallel lateral side portions 54, 55, and plural slider brackets 58 carried on an underside of each parallel lateral side portion 54, 55, and each of the plural slider brackets 58 support at least one slide member 59, so that at least one slide member 59 translates/slides along an upper surface of the parallel lateral side portions 54, 55 of the fixed height frame 10 upper frame member 12, and a generally planar and elongate roller shield 85 is carried by, and depends downwardly from, an underside of the slidably movable bed deck frame 50 adjacent laterally outwardly of the slider brackets 58, on each lateral side portion 54, 55 of the slidably movable bed deck frame 50, each roller shield 85 having a top to bottom height dimension that is greater than a diameter of the at least one slide member 59, and having a length dimension that is greater than the distance between the plural slider brackets 58 carried on one lateral side portion 54, 55 of the slidably movable bed deck frame 50, so as to simultaneously shield the slide members 59 of the spaced apart slider brackets 58 from entanglement, and a latch assembly 80, with an operator handle 61, on an underside of the slidably movable bed deck frame 50 to releasably engage with the spaced apart and upwardly oriented teeth 41 of the adjustment rack 40 carried by the fixed height frame 10, and a generally planar load supporting deck 80, having a top load supporting surface and an opposing bottom surface, is carried by the slidably movable bed deck frame 50 between the opposing end portions 52, 53 and between the parallel and spaced apart lateral side portions 54, 55, and a puck receiver 90 is defined in the generally planar load supporting deck 80 generally medially between the opposing parallel and spaced apart lateral side portions 83, 84 and spacedly adjacent the second handle end portion 82 to releasably engage with an outwardly extending puck of the stretcher, the puck receiver 90 having a first angled engagement guide 91, a second angled engagement guide 92, a puck anchor head 93 and a puck lock 95; the first and second angled engagement guides 91, 92 defining receiver opening 94 opposite the anchor head 93 to guide the puck carried on the underside of the stretcher into engagement with the puck lock 95 proximate the puck anchor head 93; and an elongate side rail 69 carried by the slidably movable bed deck frame 50 on plural spacedly arrayed side rail mounting posts 72 adjacent each opposing lateral side portion 54, 55 of the slidably movable bed deck frame 50 and extending parallel to, and spacedly above, the generally planar load supporting deck 80, each elongate side rail 69 having a first end portion 70, a spaced apart second end portion 71, and a side rail rotation frame 73 between the first end portion 70 and the second end portion 72, the side rail rotation frame 73 structurally carrying a generally planar, and pivotally movable slide rail panel 62 that has a first end portion 63, a second end portion 64, an inner side portion 65, a laterally outer side portion 66, a top surface 67, an opposing bottom surface 68, a hinge edge 78 and a distal edge 79, and the slide rail panel 62 is movable between a first locking position wherein the slide rail panel 62 is oriented generally vertically, and generally perpendicular relative to the generally planar load supporting deck 80 providing a physical barrier to retain a patient on the load supporting deck 80, and a second position wherein the slide rail panel 62 is oriented generally coplanar with, and spaced laterally adjacent to, the load supporting deck 80 to facilitate movement of the stretcher and patient thereon onto and off of the top load supporting deck 80.

A still further aspect of the present invention relates to a transfer assist device and further comprises a second roller wheel slide member 59 carried by the slider bracket 58, and spaced apart from a first roller wheel slide member 59, and the second roller wheel 59 simultaneously rolls along a bottom surface of the upper frame member 12 lateral side portion 12C, 12D of the fixed height frame 10.

An even still further aspect of the present invention relates to a transfer assist device for transferring a stretcher carrying a patent from a wheeled gurney to a second location, and from a first location to a wheeled gurney, the transfer assist device comprising a fixed height frame 10 having a first end portion 16, a second end portion 17, a first lateral side 11C, 12C, a second lateral side 11D, 12D and a predetermined height dimension between an upper edge portion and a lower edge portion; an adjustment rack 40, adjacent the upper edge portion of the fixed height frame 10, that provides controllable movement, and positional securement, of a slidably movable bed deck frame 50 relative to the fixed height frame 10 between a first position wherein the slidably movable bed deck frame 50 is positioned adjacent above, and substantially centered over, the fixed height frame 50, and a second extended position wherein the slidably movable bed deck frame 50 is translated along the fixed height frame 10 to extend endwardly outwardly from a foot end portion 16 of the fixed height frame 10; the slidably movable bed deck frame 50 is rectangular in peripheral configuration and has a handle end 53, a foot end 52, a first lateral side 54 and a second lateral side 55 and the first and second lateral sides 54, 55 are parallel to one another, and are both longer in length dimension than the handle end 53 and the foot end 52, and the foot end 52 is parallel to the handle end 53; plural slide brackets 58 structurally carried on an underside of the slidably movable bed deck frame 50, and each of the plural slide brackets 58 support at least one slide member 59 that translates along the upper frame member 12 of the fixed height frame 10 so that the slidably movable bed deck frame 50 translates along the fixed height frame 10; a latch assembly 60, having an operator handle 61, on an underside of the slidably movable bed deck frame 50 to controllably engage with the adjustment rack 40 carried by the fixed height frame 10; a generally planar load supporting deck 80 carried by the slidably movable bed deck frame 50 between the handle end 53 and the foot end 52 and between the parallel lateral side portions 54, 55; and a puck receiver 90 is defined in the generally planar load supporting deck 80 between the lateral side portions 81, 82 and spacedly adjacent the handle end portion 53 to releasably engage with an outwardly extending puck carried by the stretcher.

In compliance with the statute, the invention has been described in language more or less specific as to structural and methodical features. It is to be understood, however, that the invention is not limited to the specific features shown and described because the means herein disclosed comprise preferred forms of putting the invention into effect. The invention, is therefore, claimed in any of its forms or modifications within the proper scope of the appended claims and appropriately interpreted in accordance with the Doctrine of Equivalence.

I claim:

1. A transfer assist device for transferring a stretcher carrying a patient from a wheeled gurney to a first location, and from the first location to a wheeled gurney, or to a second location, the transfer assist device comprising:
    a fixed height frame having a first end portion, a second end portion, a first lateral side, a second lateral side and a predetermined height dimension between an upper edge portion and a lower edge portion;
    an adjustment rack, adjacent the upper edge portion of the fixed height frame, that provides controllable movement, and positional securement, of a slidably movable bed deck frame relative to the fixed height frame between a first position wherein the slidably movable bed deck frame is positioned adjacent above, and substantially centered over, the fixed height frame, and a second extended position wherein the slidably movable bed deck frame is translated along the fixed height frame to extend endwardly outwardly from a first end portion of the fixed height frame;
    the slidably movable bed deck frame is quadrilateral in peripheral configuration and has a handle end, a foot end, a first shorter lateral side and a second longer lateral side and the first and second lateral sides are parallel to one another, and are both longer in length dimension than the handle end and the foot end, and the foot end is not parallel to the handle end;
    a plurality of slide brackets structurally carried on an underside of the slidably movable bed deck frame, and each of the plurality of slide brackets support at least one slide member that translates along the upper edge portion of the fixed height frame so that the slidably movable bed deck frame translates along the fixed height frame;
    a latch assembly, having an operator handle, on an underside of the slidably movable bed deck frame to controllably engage with the adjustment rack carried by the fixed height frame;
    a generally planar load supporting deck carried by the slidably movable bed deck frame between the handle end and the foot end and between the parallel lateral side portions; and
    a puck receiver is defined in the generally planar load supporting deck between the lateral side portions and spacedly adjacent the handle end portion to releasably engage with an outwardly extending puck carried by the stretcher.

2. The transfer assist device of claim 1 and further comprising:
    an elongate side rail carried by the slidably movable bed deck frame on a plurality of speacedly arrayed side rail mounting posts adjacent each opposing lateral side portion of the slidably movable bed deck frame and extending parallel to, and spaced above the load supporting deck, each elongate side rail having a first end portion, a spaced apart second end portion, and a side rail rotation frame between the first end portion and the second end portion, the rotation frame structurally carrying a generally planar, and pivotally movable slide rail panel that has a top surface, an opposing bottom surface, a hinge edge and a distal edge, and the slide rail panel is movable between a first locking position wherein the slide rail panel is oriented generally vertically, and generally perpendicular relative to the load supporting deck providing a physical barrier to retain a patient on the load supporting deck, and a second position wherein the slide rail panel is oriented generally coplanar with, and spaced laterally adjacent to, the load supporting deck to facilitate movement of the stretcher and/or patient thereon onto and off of the load supporting deck.

3. The transfer assist device of claim 2 and further comprising:
    an operator controllable locking mechanism carried by the generally planar slide rail panel that positionally secures the slide rail panel in a desired position relative to the load supporting deck.

4. The transfer assist device of claim 1 and further comprising:
    a generally planar and elongate roller shield carried by, and depending downwardly from, an underside of the slidably movable bed deck frame adjacent laterally outwardly of a plurality of wheel brackets, each roller shield having a height dimension that is greater than a diameter of the at least one roller wheel, and having a length dimension that is greater than a distance between the plurality of wheel brackets carried on one lateral side portion of the slidably movable bed deck frame, to simultaneously shield the roller wheels of the spaced apart wheel brackets from entanglement.

5. The transfer assist device of claim 1 and wherein the second location is an aircraft patient supporting surface.

6. The transfer assist device of claim 1 and wherein the first location is an aircraft patient supporting surface.

7. The transfer assist device of claim 1 and wherein the fixed height frame has a lower frame member and an upper frame member.

8. The transfer assist device of claim 7 and wherein the lower frame member is generally rectilinear in peripheral configuration and has two opposing parallel and spaced apart end portions formed of beams, and two opposing and spaced apart parallel lateral side portions formed of beams, and the two opposing parallel and spaced apart lateral side portions are longer in a length dimension than the parallel and spaced apart end portions, and the end portion beams and the lateral side portion beams are structurally interconnected to one another at adjacent end portions, and plural cross braces formed of beams extend between the parallel spaced apart lateral side portions;and
    the upper frame member is generally rectilinear in peripheral configuration and has two opposing parallel and spaced apart end portions formed of beams, and two opposing parallel and spaced apart lateral side portions formed of beams, and the two opposing parallel and spaced apart lateral side portions are longer in a length dimension than the parallel and spaced apart end portions, and the end portion beams and the lateral side portion beams are structurally interconnected to one another at adjacent end portions, and plural cross braces formed of beams extend between the parallel lateral side portions; and the upper frame member is longer in the length dimension than the lowerframe member and is structurally interconnected to, and is spaced apart from the lower frame member, by a predetermined fixed height distance, by plural spacedly arrayed frame supports that extend between an upper surface of the lower frame member, and a lower surface of the upper frame member, and the fixed height frame is secured to an upper surface of the wheeled gurney with straps.

9. The transfer assist device of claim 1 and wherein the fixed height frame is formed, at least partially, of box beams.

10. The transfer assist device of claim 1 and wherein the fixed height frame is formed, at least partially, of tubular beams.

11. The transfer assist device of claim 1 and wherein the fixed height frame is formed, at least partially, of sheet metal.

12. The transfer assist device of claim 1 and wherein the fixed height frame is formed of box beams and tubular beams and sheet metal.

13. The transfer assist device of claim 1 and wherein the slide member is a roller wheel carried on an axle.

14. The transfer assist device of claim 1 and wherein the adjustment rack is elongate and has a plurality of spaced apart and upwardly oriented teeth and is carried by the fixed height frame, adjacent an upper edge of the fixed height frame, and the plurality of spaced apart and upwardly oriented teeth releasably and controllable engage with the latch assembly to facilitate controllable movement, and positional securement, of the slidably movable bed deck frame relative to the fixed height frame between a first position wherein the slidably movable bed deck frame is positioned above, and substantially centered over, the fixed height frame, and a second extended position wherein the slidably movable bed deck frame is translated along the fixed height frame to extend endwardly outwardly from the first end portion of the fixed height frame.

15. The transfer assist device of claim 1 and wherein the slidably movable bed deck frame has, two opposing and spaced apart end portions, formed of beams, and two opposing and spaced apart parallel lateral side portions, formed of beams, and each of the two opposing and spaced apart lateral side portions have different length dimensions, and the slidably movable bed deck frame is slidably carried by the fixed height frame;
- a handle end portion, formed of a beam, extends generally perpendicularly between the two spaced apart and parallel lateral side portions at proximate ends thereof and is structurally interconnected thereto at adjacent end portions, and the handle end portion carries an upwardly extending handle;
  - a foot end portion formed of a beam, extends between and is structurally interconnected to proximate end portions of the two spaced apart and parallel lateral side portions, opposite the handle end portion, and the foot end portion is not parallel to the handle end portion; and
- strengthening braces are spacedly arrayed between, and structurally interconnect the spaced apart parallel lateral side portions.

16. The transfer assist device of claim 1 and wherein the puck receiver has a first angled engagement guide, a second angled engagement guide, a puck anchor head and a puck lock, and the first and second angled engagement guides define a receiver opening opposite the anchor head to guide the "puck" carried on the underside of the stretcher into engagement with the puck lock proximate the puck anchor head to positionally secure the stretcher on the load supporting deck.

17. A transfer assist device for transferring a stretcher carrying a patient from a wheeled gurney to a helicopter loading surface, and from a helicopter loading surface to a wheeled gurney, the transfer assist device comprising:
- a fixed height frame having a lower frame member and an upper frame member, the lower frame member is generally rectilinear in peripheral configuration and has two opposing parallel and spaced apart end portions formed of beams, and two opposing and spaced apart parallel lateral side portions formed of beams, and the two opposing parallel and spaced apart lateral side portions are longer in a length dimension than the parallel and spaced apart end portions, and the end portion beams and the lateral side portion beams are structurally interconnected to one another at adjacent end portions, and plural cross braces formed of beams extend between the parallel spaced apart lateral side portions, and
- the upper frame member is generally rectilinear in peripheral configuration and has two opposing parallel and spaced apart end portions formed of beams, and two opposing parallel and spaced apart lateral side portions formed of beams, and the two opposing parallel and spaced apart lateral side portions are longer in a length dimension than the parallel and spaced apart end portions, and the end portion beams and the lateral side portion beams are structurally interconnected to one another at adjacent end portions, and plural cross braces formed of beams extend between the parallel lateral side portions, and
- the upper frame member is longer in the length dimension than the lower frame member and is structurally interconnected to, and is spaced apart from the lower frame member, by a predetermined fixed height distance, by a plurality of spacedly arrayed frame supports that extend between an upper surface of the lower frame member, and a lower surface of the upper frame member, each of the plurality of frame supports defining at least one slot for a securing strap to secure the fixed height frame to an upper surface of the wheeled gurney;
- an adjustment rack having a plurality of spaced apart and upwardly oriented teeth is carried by the upper frame member, adjacent an upper edge of the fixed height frame, and the plurality of spaced apart and upwardly oriented teeth facilitate controllable movement, and positional securement, of a slidably movable bed deck frame relative to the fixed height frame between a first position wherein the slidably movable bed deck frame is positioned above, and substantially centered over, the fixed height frame, and a second extended position wherein the slidably movable bed deck frame is translated along the fixed height frame to extend endwardly outwardly from the first end portion of the fixed height frame;
- the slidably movable bed deck frame having,
  - two opposing and spaced apart end portions, formed of beams, and two opposing and spaced apart parallel lateral side portions, formed of beams, and each of the two opposing and spaced apart lateral side portions have different lengths dimensions, and the slidably movable bed deck frame is slidably carried by the fixed height frame adjacent above the upper frame member and opposite the lower frame member and, a handle end portion, formed of a beam, extends generally perpendicularly between the two spaced apart and parallel lateral side portions at proximate ends thereof and is structurally interconnected thereto at adjacent end portions, and the handle end portion carries an upwardly extending handle, and a foot end portion formed of a beam, extends between and is structurally interconnected to proximate end portions of the two spaced apart and parallel lateral side portions, opposite the handle end portion, and the foot end portion is not parallel to the handle end portion, and strengthening braces are spacedly arrayed between, and structurally interconnect the spaced apart parallel lateral side portions, and aplurality of wheel brackets carried on an underside of each parallel lateral side portion, and each of the plurality of wheel brackets support at least one roller wheel on an axle, so that at least one roller wheel rolls along an upper surface of the parallel lateral side portions of the fixed height frame upper frame member, and a generally planar and elongate roller shield is carried by, and depends downwardly from, an underside of the slidably movable bed deck frame adjacent laterally outwardly of the wheel brackets, on each lateral side portion of the slidably movable bed deck frame, each roller shield having a height dimension that is greater than a diameter of the ate least one roller wheel, and having a length dimension that is greater than the distance between the plural wheel brackets carried on one lateral side portion of the slidably movable bed deck frame, so as to simultaneously shield the roller wheels of the spaced apart wheel brackets from entanglement, and a latch assembly, with an operator handle, on an underside of the slidably movable bed deck frame to releasably engage with the spaced apart and upwardly oriented teeth of the adjustment rack carried by the fixed height frame, and a generally planar load supporting deck, having a top load supporting surface and an opposing bottom surface, is carried by the slidably movable bed deck frame between the opposing end portions and between the parallel and spaced apart lateral side portions, and a puck receiver is defined in the generally planar load supporting deck generally medially between the opposing parallel and spaced apart lateral side portions and spacedly adjacent the second handle end portion to releasably engage with an outwardly extending puck of the stretcher, the puck receiver having a first angled engagement guide, a second angled engagement guide, a puck anchor head and a puck lock; the first and second angled engagement guides defining receiver opening opposite the anchor head to guide the "puck" carried on the underside of the stretcher into engagement with the puck lock proximate the puck anchor head; and an elongate side rail carried by the slidably movable bed deck frame on plural spacedly arrayed side rail mounting posts adjacent each opposing lateral side portion of the slidably movable bed deck frame and extending parallel to, and spacedly above, the top load supporting surface of the generally planar load supporting deck, each elongate side rail having a first end portion, a spaced apart second end portion, and a side rail rotation frame between the first end portion and the second end portion, the side rail rotation frame structurally carrying a generally planar, and pivotally movable slide rail panel that has a top surface, an opposing bottom surface, a hinge edge and a distal edge, and the slide rail panel is movable between a first locking position wherein the slide rail panel is oriented generally vertically, and generally perpendicular relative to the top load supporting surface of the generally planar load supporting deck providing a physical barrier to retain a patient on the top load supporting surface, and a second position wherein the slide rail panel is oriented generally coplanar with, and spaced Laterally adjacent to, the top load supporting surface of the load supporting deck to facilitate movement of the stretcher and patient thereon onto and off of the top load supporting surface.

18. The transfer assist device of claim 17 and further comprising:
a second roller wheel carried by the wheel bracket, and spaced apart from the first roller wheel, and the second roller wheel simultaneously rolls along a bottom surface of the upper frame member lateral side portion of the fixed height frame.

19. A transfer assist device for transferring a stretcher carrying a patient from a wheeled gurney to a first location, and from the first location to a wheeled gurney, or to a second location, the transfer assist device comprising:
a fixed height frame having a first end portion, a second end portion, a first lateral side, a second lateral side and a predetermined height dimension between an upper edge portion and a lower edge portion;
an adjustment rack, adjacent the upper edge portion of the fixed height frame, that provides controllable movement, and positional securement, of a slidably movable bed deck frame relative to the fixed height frame between a first position wherein the slidably movable bed deck frame is positioned adjacent above, and substantially centered over, the fixed height frame, and a second extended position wherein the slidably movable bed deck frame is translated along the fixed height frame to extend endwardly outwardly from a first end portion of the fixed height frame;
the slidably movable bed deck frame is rectangular in peripheral configuration and has a handle end, a foot end, a first lateral side and a second lateral side and the first and second lateral sides are parallel to one another, and are both longer in length dimension than the handle end and the foot end, and the foot end is parallel to the handle end;
a plurality of slide brackets structurally carried on an underside of the slidably movable bed deck frame, and each of the plurality of slide brackets support at least one slide member that translates along the upper edge portion of the fixed height frame so that the slidably movable bed deck frame translates along the fixed height frame;
a latch assembly, having an operator handle, on an underside of the slidably movable bed deck frame to controllably engage with the adjustment rack carried by the fixed height frame;

a generally planar load supporting deck carried by the slidably movable bed deck frame between the handle end and the foot end and between the parallel lateral side portions; and a puck receiver is defined in the generally planar load supporting deck between the lateral side portions and spacedly adjacent the handle end portion to releasably engage with an outwardly extending puck carried by the stretcher.

* * * * *

UNITED STATES PATENT AND TRADEMARK OFFICE
CERTIFICATE OF CORRECTION

PATENT NO. : 11,666,495 B2
APPLICATION NO. : 16/858601
DATED : June 6, 2023
INVENTOR(S) : Mark S. Sales It is certified that error appears in the above-identified patent and that said Letters Patent is hereby corrected as shown below:

On the Title Page

Item [56], Line 3: Delete the word "Mass" and insert the word --Moss--.

In the Specification

Column 6: Line 22: Delete the word "patent" and insert the word --patient--.

Column 8: Line 67: Insert a --.-- after the word --statute--.

Column 17: Line 5: Delete the number "118" and insert the number --11B--.

Column 18: Line 27: Delete the word "patent" and insert the word --patient--.

Column 19: Line 50: Delete the number "80" and insert the number --60--.

Column 22: Line 4: Delete the word "speacedly" and insert the word --spacedly--.

Column 25: Line 35: Delete the word "ate" and insert the word --at--.

Signed and Sealed this
Twenty-fourth Day of September, 2024

Katherine Kelly Vidal
*Director of the United States Patent and Trademark Office*